United States Patent
Chen et al.

(10) Patent No.: US 9,491,649 B2
(45) Date of Patent: Nov. 8, 2016

(54) METHOD AND APPARATUS FOR TRANSMITTING PERIODIC FEEDBACK REPORT

(75) Inventors: Yijian Chen, Shenzhen (CN); Jun Xu, Shenzhen (CN); YuNgok Li, Shenzhen (CN); Junfeng Zhang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 282 days.

(21) Appl. No.: 13/877,165

(22) PCT Filed: Jun. 24, 2011

(86) PCT No.: PCT/CN2011/076326
§ 371 (c)(1),
(2), (4) Date: Mar. 30, 2013

(87) PCT Pub. No.: WO2012/041086
PCT Pub. Date: Apr. 5, 2012

(65) Prior Publication Data
US 2013/0188623 A1 Jul. 25, 2013

(30) Foreign Application Priority Data
Sep. 30, 2010 (CN) .......................... 2010 1 0507040

(51) Int. Cl.
*H04W 24/10* (2009.01)
*H04L 1/00* (2006.01)

(52) U.S. Cl.
CPC ............ *H04W 24/10* (2013.01); *H04L 1/0027* (2013.01); *H04L 1/0028* (2013.01); *H04L 1/0071* (2013.01); *H04L 1/0072* (2013.01); *H04L 1/0026* (2013.01)

(58) Field of Classification Search
None
See application file for complete search history.

(56) References Cited

U.S. PATENT DOCUMENTS

2009/0207784 A1* 8/2009 Lee et al. ................... 370/328
2010/0040001 A1* 2/2010 Montojo et al. ............ 370/329
(Continued)

FOREIGN PATENT DOCUMENTS

CN 101789849 A 7/2010
CN 101807974 A 8/2010
(Continued)

OTHER PUBLICATIONS

P.R. China, State Intellectual Property Office, International Search Report for International Application No. PCT/CN2011/076326, mailed Oct. 13, 2011.
(Continued)

*Primary Examiner* — Hassan Kizou
*Assistant Examiner* — Roberta A Shand
(74) *Attorney, Agent, or Firm* — Bright IP Law Offices

(57) ABSTRACT

Disclosed in the present invention are a method and an apparatus for transmitting a periodic feedback report. In this case, the method includes: coding a periodic feedback report to be transmitted and data information corresponding to a transmission block respectively, wherein the periodic feedback report includes one of the following information: a combined coding index of rank indicator (RI) information and first pre-coding matrix indicator (PMI-1) information, a combined coding index of the RI and pre-coding type indication (PTI) information, and the PMI-1; intercepting correspondingly coded information according to the target length; and when a transmission block corresponds to a single layer or multiple layers, carrying out channel interleave on the coded information on the single layer or multiple layers to be transmitted on the transmission block, and transmitting the interleaved information on a layer corresponding to a physical uplink shared channel (PUSCH).

28 Claims, 4 Drawing Sheets

(56) References Cited

U.S. PATENT DOCUMENTS

| | | | |
|---|---|---|---|
| 2010/0195624 A1* | 8/2010 | Zhang et al. | 370/335 |
| 2010/0202311 A1 | 8/2010 | Lunttila | |
| 2011/0243066 A1* | 10/2011 | Nayeb Nazar et al. | 370/328 |
| 2011/0310853 A1* | 12/2011 | Yin et al. | 370/335 |

FOREIGN PATENT DOCUMENTS

| | | |
|---|---|---|
| CN | 101969361 A | 2/2011 |
| JP | 2005-502223 A | 1/2005 |
| WO | 2010105667 A1 | 9/2010 |

OTHER PUBLICATIONS

EPO, Extended European Search Report for Application No. 11827982.7 mailed Oct. 30, 2013.

Ericsson, Further Discussions on SRS Enhancements, TSG-RAN WGI #60, SF, USA, Feb. 22-26, 2010.

Samsung, Performance evaluations of Rel.10 4Tx feedback enhancement, 3GPP TSG RAN WG1 Meeting #62, Madrid, Spain, Aug. 23-Aug. 27, 2010.

SIPO, Office Action for Application No. 2010105070407 dated May 21, 2014.

Interdigital Communications et al: "Procedures for collisions between periodic and aperiodic CQI/PMI/RI reports and Draft CR to 36.213", 3GPP Draft; R1-083513, 3rd Generation Partnershi p. Project (3GPP), Mobile Competence Centre; 650, Route Des Lucioles; F-06921 Sophia-Antipolis Cedex, France, No. Prague, Czech Republic; 20080924, Sep. 24, 2008, XP050316880, [retrieved on Sep. 24, 2008].

Samsung et al: "Further Refinements on Rank Reporting", 3GPP Draft; RI-081116 Remaining Rank Report, 3rd Generation Partnership Project (3GPP), Mobile Competence Centre; 650, Route Des Lucioles ; F-06921 Sophia-Antipolis Cedex ; France, vol. RAN WGI, No. Sorrento, Italy; 20080215, Feb. 15, 2008, XP050109562, [retrieved on Feb. 15, 2008].

Samsung: "Periodic CQI/PMI/RI Reporting 1-28 with CA", 3GPP Draft; RI-104580 CSI Feedback for CA, 3rd Generation Partnership Project (3GPP), Mobile Competence Centre; 650, Route Des Lucioles ; F-06921 Sophia-Antipolis Cedex; France, vol. RAN WGI, No. Madrid, Spain; 20100823, Aug. 17, 2010, XP050449876, [retrieved on Aug. 17, 2010].

Texas Instruments: "Coding of Control Information on PUSCH", 3GPP Draft; R1-081989 TI Coding PUSCH, 3rd Generation Partnership Project (3GPP), Mobile Competence Centre; 650, Route Des Lucioles ; F-06921 Sophia-Antipolis Cedex; France, vol. RAN WG1, No. Kansas City, USA; 20080514, May 14, 2008, XP050110336, [retrieved on May 14, 2008].

AH Chairman: "Summary of AH on AI 6.3.4 a 1-28 UE Procedures for downlink shared channela", 3GPP Draft; R1-081137 RAN1 52 DL Proc AH Summary, 3rd Generation Partnership Project (3GPP), Mobile Competence Centre, 650, Route Des Lucioles; F-06921 Sophia-Antipolis Cedex; France, vol. RAN WG1, No. Sorrento, Italy; 20080211-20080215, Feb. 15, 2008, XP050596680, [retrieved on Feb. 15, 2008].

Samsung et al: "Simplex coding for 1-28 ACK/NACK bits in PUSCHI", 3GPP Draft; RI-082086 an Coding in PUSCH, 3RD Generation Partnership Project (3GPP), Mobile Competence Centre; 650, Route Des Lucioles; F-06921 Sophia-Antipolis Cedex; France, vol. RAN WG1, No. Kansas City, USA; 20080514, May 14, 2008, XP050110413, [retrieved on May 14, 2008].

Ericsson: "On the CQI requirements", 3GPP Draft; R4-081367, 3rd Generation Partnership Project (3GPP), Mobile Competence Centre; 650, Route Des Lucioles; F-06921 Sophia-Antipolis Cedex; France, vol. Ran WG4, No. Munich, Germany; 20080613, Jun. 13, 2008, XP050179951, [retrieved on Jun. 13, 2008].

Motorola, Required PUCCH and PUSCH CQI/PMI/RI Reporting Modes, 3GPP TSG RAN 1#53, Kansas City, USA May 5-9, 2008.

JPO, Office Action for Application No. 2013-530542 dated Mar. 17, 2015.

* cited by examiner

METHOD AND APPARATUS FOR TRANSMITTING PERIODIC FEEDBACK REPORT

CROSS REFERENCE TO RELATED APPLICATIONS

This application is the U.S. National Stage of International Patent Application No. PCT/CN2011/076326 filed on Jun. 24, 2011, which claims priority to Chinese Patent Application No. 201010507040.7 filed on Sep. 30, 2010. Both the PCT Application and Chinese Application are hereby incorporated by reference in their entirety.

FIELD OF THE INVENTION

The present invention relates to the digital communication field and, particularly, to a method and an apparatus for transmitting a periodic feedback report.

BACKGROUND OF THE INVENTION

In the long term evolution (LTE) system, the control signaling which needs to be transmitted in the uplink includes an acknowledgement/negative acknowledgement (ACK/NACK) message, and information reflecting the downlink physical channel state (CSI), which information has three forms: channel quality indication (CQI), pre-coding matrix indicator (PMI), and rank indicator (RI).

In the LTE, the feedback of channel information is mainly to use a feedback method with a relatively simple single codebook; however, the performance of the transmission pre-coding technology of MIMO more depends upon the feedback accuracy of the codebook.

Herein, the basic principle of channel information quantization feedback based on codebook will be described briefly as follows:

assuming that the limited feedback channel capacity is B bps/Hz, then the number of available codewords is $N=2^B$. The characteristic vector space of the channel matrix constructs a codebook space $\Re = \{F_1, F_2 \ldots F_N\}$ after being quantized. The transmission end and receiving end together save or generate this codebook in real time (the transmission end and receiving end are the same). According to the channel matrix H obtained by the receiving end, the receiving end selects a codeword $\hat{F}$ best matched the channel from $\Re$ according to a certain rule and feeds back the codeword number i to the transmission end. Herein, the codeword number is referred to as PMI (pre-coding matrix indicator). The transmission end finds the corresponding pre-coding codeword $\hat{F}$ according to this number i so as to obtain the channel information, and $\hat{F}$ represents the characteristic vector information of the channel.

Generally, $\Re$ can be further divided into codebooks corresponding to a plurality of Ranks, and each rank corresponds to a plurality of codewords so as to quantize the pre-coding matrix constructed by the channel characteristic vector under this rank. Since the rank of the channel is equal to the number of non-zero characteristic vectors, generally, when Rank is N, the codeword has N columns. Accordingly, the codebook $\Re$ can be divided into a plurality of sub-codebooks according to different ranks, as shown in Table 1.

TABLE 1

| $\Re$ | | |
|---|---|---|
| Number of layers v (Rank) | | |
| 1 | 2 | ... N |
| $\Re_1$ codeword vector collection with the number of columns being 1 | $\Re_2$ codeword matrix collection with the number of columns being 2 | ... $\Re_N$ codeword matrix collection with the number of columns being 2 |

In this case, when Rank >1, the codeword which needs to be stored is in the form of matrix, wherein the codebook in the LTE protocol exactly uses such feedback method of codebook quantization, and the downlink 4-transmission antenna codebook of the LTE is as shown in Table 2, actually, the meaning of the pre-coding codebook in the LTE and that of the channel information quantization codebook are the same. Hereinafter, for the sake of being uniform, the vector can also be regarded as a matrix of 1 dimension.

TABLE 2

| Codeword | | Total number of layers v (R1) | | | |
|---|---|---|---|---|---|
| Index | $u_n$ | 1 | 2 | 3 | 4 |
| 0 | $u_0 = [1\ -1\ -1\ -1]^T$ | $W_0^{(1)}$ | $W_0^{(14)}/\sqrt{2}$ | $W_0^{(124)}/\sqrt{3}$ | $W_0^{(1234)}/2$ |
| 1 | $u_1 = [1\ -j\ 1\ j]^T$ | $W_1^{(1)}$ | $W_1^{(12)}/\sqrt{2}$ | $W_1^{(123)}/\sqrt{3}$ | $W_1^{(1234)}/2$ |
| 2 | $u_2 = [1\ 1\ -1\ 1]^T$ | $W_2^{(1)}$ | $W_2^{(12)}/\sqrt{2}$ | $W_2^{(123)}/\sqrt{3}$ | $W_2^{(3214)}/2$ |
| 3 | $u_3 = [1\ j\ 1\ -j]^T$ | $W_3^{(1)}$ | $W_3^{(12)}/\sqrt{2}$ | $W_3^{(123)}/\sqrt{3}$ | $W_3^{(3214)}/2$ |
| 4 | $u_4 = [1\ (-1-j)/\sqrt{2}\ -j\ (1-j)/\sqrt{2}]^T W_4^{(1)}$ | $W_4^{(14)}/\sqrt{2}$ | $W_4^{(124)}/\sqrt{3}$ | $W_4^{(1234)}/2$ | |
| 5 | $u_5 = [1\ (1-j)/\sqrt{2}\ j\ (-1-j)/\sqrt{2}]^T$ | $W_5^{(1)}$ | $W_5^{(14)}/\sqrt{2}$ | $W_5^{(124)}/\sqrt{3}$ | $W_5^{(1234)}/2$ |
| 6 | $u_6 = [1\ (1+j)/\sqrt{2}\ -j\ (-1+j)/\sqrt{2}]^T W_6^{(1)}$ | $W_6^{(13)}/\sqrt{2}$ | $W_6^{(134)}/\sqrt{3}$ | $W_6^{(1324)}/2$ | |
| 7 | $u_7 = [1\ (-1+j)/\sqrt{2}\ j\ (1+j)/\sqrt{2}]^T$ $W_7^{(1)}$ | $W_7^{(13)}/\sqrt{2}$ | $W_7^{(134)}/\sqrt{3}$ | $W_7^{(1324)}/2$ | |
| 8 | $u_8 = [1\ -1\ 1\ 1]^T$ | $W_8^{(1)}$ | $W_8^{(12)}/\sqrt{2}$ | $W_8^{(124)}/\sqrt{3}$ | $W_8^{(1234)}/2$ |
| 9 | $u_9 = [1\ -j\ -1\ -j]^T$ | $W_9^{(1)}$ | $W_9^{(14)}/\sqrt{2}$ | $W_9^{(134)}/\sqrt{3}$ | $W_9^{(1234)}/2$ |
| 10 | $u_{10} = [1\ 1\ 1\ -1]^T$ | $W_{10}^{(1)}$ | $W_{10}^{(13)}/\sqrt{2}$ | $W_{10}^{(123)}/\sqrt{3}$ | $W_{10}^{(1324)}/2$ |
| 11 | $u_{11} = [1\ j\ -1\ j]^T$ | $W_{11}^{(1)}$ | $W_{11}^{(13)}/\sqrt{2}$ | $W_{11}^{(134)}/\sqrt{3}$ | $W_{11}^{(1324)}/2$ |
| 12 | $u_{12} = [1\ -1\ -1\ 1]^T$ | $W_{12}^{(1)}$ | $W_{12}^{(12)}/\sqrt{2}$ | $W_{12}^{(123)}/\sqrt{3}$ | $W_{12}^{(1234)}/2$ |
| 13 | $u_{13} = [1\ -1\ 1\ -1]^T$ | $W_{13}^{(1)}$ | $W_{13}^{(13)}/\sqrt{2}$ | $W_{13}^{(123)}/\sqrt{3}$ | $W_{13}^{(1324)}/2$ |
| 14 | $u_{14} = [1\ 1\ -1\ -1]^T$ | $W_{14}^{(1)}$ | $W_{14}^{(13)}/\sqrt{2}$ | $W_{14}^{(123)}/\sqrt{3}$ | $W_{14}^{(3214)}/2$ |
| 15 | $u_{15} = [1\ 1\ 1\ 1]^T$ | $W_{15}^{(1)}$ | $W_{15}^{(12)}/\sqrt{2}$ | $W_{15}^{(123)}/\sqrt{3}$ | $W_{15}^{(1234)}/2$ |

Where $W_n = I - 2u_n u_n^H / u_n^H u_n$, I is a unit matrix, and $W_k^{(j)}$ represents the jth column vector of the matrix $W_k$. $W_k^{(j_1, j_2, \ldots, j_n)}$ represents a matrix consisting of the $(j_1, j_2, \ldots, j_n)$th columns of the matrix $W_k$.

What is described above is the principle of the codebook feedback technology in the ITE, and when being applied, some more particular feedback methods will be related.

The feedback granularity of the channel information will be first introduced. In the LTE standard, the minimum feedback unit of the channel information is subband channel information, one subband is composed of several RBs (resource block), each RB is composed of a plurality of REs (resource element), RE is the minimum unit of the time frequency resource in the LTE, and the LTE-A continues to use the resource representation method in the LTE. A few subbands can be referred to as Multi-Subband, and several subbands can be referred to as Wideband.

Hereinafter, the feedback contents related to the channel information in the LTE will be introduced, and the channel state information feedback includes: channel quality indication (abbreviated as CQI), PMI and rank indicator (abbreviated as RI). Herein, the most concerned CSI content is PMI information, however, RI and CQI also belong to the feedback contents of the channel state information.

CQI is an indicator for measuring the quality of the downlink channel. In the 36-213 protocol, CQI is represented using integral values of 0-15, which represent different CQI levels respectively, and different CQIs correspond to their own modulation and coding scheme (MCS).

RI is used to describe the number of spatially independent channels and corresponds to the Rank of a channel response matrix. Under the open loop spatial multiplexing and closed loop spatial multiplexing, the UE needs to feed back the RI information, and the RI information need not be fed back under other modes. The rank of a channel matrix corresponds to the number of layers.

In the LTE system, the ACK/NACK acknowledge message is transmitted over the Physical Uplink Control Channel (PUCCH) in the format of 1/1a/1b (PUCCH format1/1a1/b), if the user equipment (UE) needs to send uplink data, then they are transmitted over the Physical Uplink Shared Channel (PUSCH), and the feedback of CQI/PMI and RI can be periodic feedback and can also be non-periodic feedback. Table 3 shows the uplink physical channels corresponding to periodic feedback and non-periodic feedback:

TABLE 3

| Scheduling mode | Periodic CQI report channel | Non-periodic CQI report channel |
|---|---|---|
| Frequency non-selectivity | PUCCH | |
| Frequency selectivity | PUCCH | PUSCH |

In this case, as to CQI/PMI and RI which are fed back periodically, if the UE does not need to send uplink data, then the CQI/PMI and RI which are fed back periodically are transmitted over the PUCCH in the format of 2/2a/2b (PUCCH format2/2a/2b), and if the UE needs to send uplink data, then the CQI/PMI and RI are transmitted over the PUSCH; and as to CQI/PMI and RI which are fed back non-periodically, they are only transmitted over PUSCH.

FIG. 1 shows a schematic diagram of an uplink control signaling being transmitted over the PUSCH in the LTE system, and the PUSCH carries uplink data and uplink control information, wherein the uplink control information includes CQI, PMI, RI and ACK/NACK.

FIG. 2 shows a schematic diagram of a PUSCH transmission mode in the LTE system, and it can be seen from the figure that the uplink data generates an SC-FDMA signal after being scrambled, modulated, transmitted and pre-coded, then RE mapped. PUSCH is transmitted in the form of single antenna, therefore, PUSCH only corresponds to one transmission block, which transmission block forms a codeword stream after being channel coded, that is to say, in the LTE system, the PUSCH only has one codeword stream.

In the LTE system, the eNB sends the modulation coding index $I_{MCS}$ to the UE via the PDCCH, which formulates relevant information such as the modulation coding index $I_{MCS}$ and the modulation of PUSCH, the size of the transmission block, the redundant version, etc., and the relationships therebetween, as shown in Table 4. In the LTE system, it is also formulated that the code rate is obtained according to the relationship between the size index of the transmission block and the size of the transmission block and according to the size of the transmission block and the size of the resource block.

TABLE 4

| Modulation coding index $I_{MCS}$ | Modulation order $Q_m'$ | Transmission block size index $I_{TBS}$ | Redundant version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | Reserved | | 1 |
| 30 | | | 2 |
| 31 | | | 3 |

The long term evolution advanced (LTE-A) system as the evolution standard of the LTE supports larger uplink transmission rate, therefore, the transmission of the PUSCH supports the form of spatial multiplexing. As to the PUSCH which is transmitted in the form of spatial multiplexing, the relevant art gives that the mapping relationship from the codeword stream to the layer is the same as the mapping from the codeword stream to the layer during the downlink transmission in the LTE system, and the particular mapping process is as shown in Table 5:

TABLE 5

| Number of layers | Number of codewords | Mapping from codeword to layer $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M_{symb}^{layer} = M_{symb}^{(0)} = M_{symb}^{(1)}/2$ |
| 4 | 2 | $x^{(0)}(i) = d^{(0)}(2i)$<br>$x^{(2)}(i) = d^{(1)}(2i)$<br>$x^{(1)}(i) = d^{(0)}(2i + 1)$<br>$x^{(3)}(i) = d^{(1)}(2i + 1)$ | $M_{symb}^{layer} = M_{symb}^{(0)}/2 = M_{symb}^{(1)}/2$ |

Where, $M_{symb}^{layer}$ represents the data amount transmitted over each layer, $M_{symb}^{(0)}$ and $M_{symb}^{layer}$ respectively represent the symbol number on each codeword stream, $d^{(0)}(i)$, $d^{(1)}(i)$, and $d^{(l)}(i)$ respectively represent the data over each codeword stream, and $x^{(0)}(i), \ldots, x^{(3)}(i)$ respectively represent the data transmitted over each layer.

Currently, the relevant art sufficiently takes how to transmit the combined coding index of RI and PMI-1, the combined coding index of RI and PTI, PMI-1 and PMI-2 over the PUCCH in the LTE-A system into account. However, the relevant art fails to take the following into account: how to transmit a periodic feedback report over the PUSCH, such as the combined coding index of RI and PMI-1, the combined coding index of RI and PTI, PMI-1, PMI-2, etc., which causes that the periodic feedback report cannot be transmitted over the PUCCH in the LTE-A system.

SUMMARY OF THE INVENTION

The main object of the present invention is to provide a method and an apparatus for transmitting a periodic feedback report so as to solve the above problem that the PUSCH cannot be used to transmit the periodic feedback report in the LTE-A system.

According to one aspect of the present invention, a method for transmitting a periodic feedback report is provided, including: coding a periodic feedback report to be transmitted and data information corresponding to a transmission block respectively, wherein the periodic feedback report includes one of the following information: a combined coding index of rank indicator (RI) information and first pre-coding matrix indicator (PMI-1) information, a combined coding index of the RI and pre-coding type indication (PTI) information, and the PMI-1; intercepting correspondingly coded information according to the target length; and when a transmission block corresponds to a single layer or multiple layers, carrying out channel interleave on the coded information on the single layer or multiple layers to be transmitted on the transmission block, and transmitting the interleaved information on a layer corresponding to a physical uplink shared channel (PUSCH).

The above carrying out channel interleave on the coded information on the single layer or multiple layers to be transmitted on the transmission block and transmitting the interleaved information on a layer corresponding to a physical uplink shared channel (PUSCH) comprises: mapping the transmitted periodic feedback report onto two timeslots of one subframe, with the periodic feedback report being mapped onto an orthogonal frequency division multiplex (OFDM) symbol at a specific location in one subframe, with the OFDM at the specific location referring to an OFDM symbol adjacent to and separated from an OFDM symbol where a demodulation reference signal is located by an OFDM symbol.

The coded information on the single layer or multiple layers comprises one of the following: coded periodic feedback report information, a combination of coded data information and coded periodic feedback report information.

The coding a periodic feedback report to be transmitted and data information corresponding to a transmission block respectively comprises: determining a periodic feedback report to be transmitted; selecting a transmission block to transmit the periodic feedback report, wherein the transmission block is a transmission block configured by a current uplink channel, there are one or two transmission blocks, with each transmission block having corresponding data information; and coding the determined periodic feedback report and the data information corresponding to the selected transmission block.

After the coding the determined periodic feedback report and the data information corresponding to the selected transmission block, the method further comprises: generating a periodic feedback report logic unit and a data information logic unit using the coded periodic feedback report information and coded data information corresponding to the transmission block in the form of modulation symbol; and the carrying out channel interleave on the coded information on the single layer or multiple layers to be transmitted on the transmission block comprises: carrying out channel interleave on the periodic feedback report logic unit and the data information logic unit on each transmission block to obtain a control and data information bit sequence.

The transmitting the interleaved information on a layer corresponding to a PUSCH comprises: if one transmission block is selected, then placing the control and data information bit sequence on the transmission block on a layer corresponding to the PUSCH for transmission; and if two transmission blocks are selected, then placing the control and data information bit sequence on a first one of the two transmission blocks on a layer on the PUSCH corresponding to the first transmission block for transmission; and placing the control and data information bit sequence on a second one of the two transmission blocks on a layer on the PUSCH corresponding to the second transmission block for transmission.

The carrying out channel interleave on the periodic feedback report logic unit and the data information logic unit on each transmission block to obtain a control and data information bit sequence comprises: when a number of transport layers corresponding to the transmission block being transmitted on the PUSCH is 1, carrying out channel interleave on the periodic feedback report logic unit and the data information logic unit to obtain a control and data information bit sequence.

The carrying out channel interleave on the periodic feedback report logic unit and the data information logic unit to obtain a control and data information bit sequence comprises: generating a virtual matrix according to a total number of the periodic report logic unit and the data information logic unit; when writing data into the virtual matrix, first progressively writing elements in the periodic report logic unit into predetermined locations of the virtual matrix row by row starting from the last row of the virtual matrix in a descending order of row, within any row, successively writing the same from left to right into respective columns of the predetermined locations; progressively writing elements in the data information logic unit into the virtual matrix row by row starting from the first row of the virtual matrix in an ascending order of row, within any row, successively writing the same into locations except those locations already occupied by the elements in the periodic report logic unit in an order from left to right; and when reading out the data from the virtual matrix, reading out the elements from that matrix column by column starting from the first column of the virtual matrix, within each column, successively reading out the same row by row in an ascending order of row, and for each element, reading out the same in its bit sequence to finally obtain the control and data information bit sequence.

The number of elements in the periodic feedback report logic unit is $M_{RI}$, the number of elements in the data information logic unit is M, and the product of the number of rows and the number of columns in the generated virtual matrix is $(M+M_{RI})$; if there is no measurement reference signal (SRS) to be sent, when a subframe uses a conventional cyclic prefix structure, the number of columns of the virtual matrix is 12; and when the subframe uses an extended cyclic prefix structure, the number of columns of the virtual matrix is 10; if there is a measurement reference signal (SRS) to be sent, when the subframe uses the conventional cyclic prefix structure, the number of columns of the virtual matrix is 11; and when the subframe uses the extended cyclic prefix structure, the number of columns of the virtual matrix is 9; and when the current subframe uses the conventional cyclic prefix, the predetermined locations refer to a virtual matrix array with the column numbers thereof being 1, 4, 7, 10; and when the current subframe uses the extended cyclic prefix, the predetermined locations refer to a virtual matrix array with the column numbers thereof being 0, 3, 5, 8.

The carrying out channel interleave on the periodic feedback report logic unit and the data information logic unit on each of the transmission blocks to obtain a control and data information bit sequence comprises: when a number of transport layers corresponding to the transmission block being transmitted on the PUSCH is 2, generating a periodic feedback report logic block unit and a data information logic block unit according to the periodic feedback report logic unit and the data information logic unit; generating a virtual matrix according to a total number of the periodic report logic block unit and the data information logic block unit; when writing data into the virtual matrix, first progressively writing elements in the periodic feedback report logic block unit into predetermined locations of the virtual matrix row by row starting from the last row of the virtual matrix in a descending order of row; then progressively writing elements in the data information logic block unit into the virtual matrix row by row starting from the first row of the virtual matrix in an ascending order of row, and skipping the locations occupied by the elements in the periodic report logic block unit; and when reading out the data from the virtual matrix, reading out the elements from that matrix column by column starting from the first column of the virtual matrix, within each column, successively reading out the same row by row in an ascending order of row, and for each element, reading out the same in its bit sequence to finally obtain the control and data information bit sequence.

The generating a periodic feedback report logic block unit and a data information logic block unit according to the periodic feedback report logic unit and the data information logic unit comprises: constructing a first periodic feedback report logic sub-unit using a first location element in the periodic feedback report logic unit, and constructing a second periodic feedback report logic sub-unit using a second location element in the periodic feedback report logic unit; constructing a first data information logic sub-unit using a first location element in the data information logic unit; and constructing a second data information logic sub-unit using a second location element in the data information logic unit; and combining the first and second periodic feedback report logic sub-units into a periodic feedback report logic block unit; and combining the first and second data information logic sub-units into a data information logic block unit.

The number of elements in the periodic feedback report logic unit is $M_{RI}$, the number of elements in the data information logic unit is M, and the product of the number of rows and the number of columns in the generated virtual matrix is $(M+M_{RI})$; if there is no SRS to be sent, when a subframe uses a conventional cyclic prefix structure, the number of columns of the virtual matrix is 12; and when the subframe uses an extended cyclic prefix structure, the number of columns of the virtual matrix is 10; if there is an SRS to be sent, when the subframe uses the conventional cyclic prefix structure, the number of columns of the virtual matrix is 11; and when the subframe uses the extended cyclic prefix structure, the number of columns of the virtual matrix is 9; and when the current subframe uses the conventional cyclic prefix, the predetermined locations refer to a virtual matrix array with the column numbers thereof being 1, 4, 7, 10; and when the current subframe uses the extended cyclic prefix, the predetermined locations refer to a virtual matrix array with the column numbers thereof being 0, 3, 5, 8.

The carrying out channel interleave on the periodic feedback report logic unit and the data information logic unit on each of the transmission blocks to obtain a control and data information bit sequence comprises: when a number of transport layers corresponding to the transmission block being transmitted on the PUSCH is 2, generating a virtual matrix according to the total number of the periodic feedback report logic unit and the data information logic unit; when writing data into the virtual matrix, writing the first location element in the periodic feedback report logic unit and the first location element in the data information logic unit into the virtual matrix in the following manner: first writing the first location element in the periodic feedback report logic unit into predetermined locations of the virtual matrix in every other row starting from the second to the last row of the virtual matrix; then writing the first location element in the data information logic unit into the virtual matrix in every other row starting from the first row of the virtual matrix in an ascending order of row, and skipping the locations occupied by the elements in the periodic report logic unit; and when reading out the data from the virtual matrix, reading out the elements from that matrix column by column starting from the first column of the virtual matrix, within each column, successively reading out the same row by row in an ascending order of row, and for each element, reading out the same in its bit sequence to finally obtain the control and data information bit sequence.

The number of elements in the periodic feedback report logic unit is $H_1'$, the number of elements in the data information logic unit is $Q_{RI}'$, and the product of the number of rows and the number of columns in the generated virtual matrix is $(H_1'+Q_{RI}')$; if there is no measurement reference signal (SRS) to be sent, when a subframe uses a conventional cyclic prefix structure, the number of columns of the virtual matrix is 12; and when the subframe uses an extended cyclic prefix structure, the number of columns of the virtual matrix is 10; if there is a measurement reference signal (SRS) to be sent, when the subframe uses the conventional cyclic prefix structure, the number of columns of the virtual matrix is 11; and when the subframe uses the extended cyclic prefix structure, the number of columns of the virtual matrix is 9; and when the current subframe uses the conventional cyclic prefix, the predetermined locations refer to a virtual matrix array with the column numbers thereof being 1, 4, 7, 10; and when the current subframe uses the extended cyclic prefix, the predetermined locations refer to a virtual matrix array with the column numbers thereof being 0, 3, 5, 8.

The carrying out channel interleave on the periodic feedback report logic unit and the data information logic unit on each of the transmission blocks to obtain a control and data information bit sequence comprises: when a number of transport layers corresponding to the transmission block being transmitted on the PUSCH is 2, generating two virtual matrixes according to the total number of the periodic feedback report logic unit and the data information logic unit, which are respectively a first virtual matrix and a second virtual matrix; when writing data into the first virtual matrix, first progressively writing the first location element in the periodic feedback report logic block unit into predetermined locations of the first virtual matrix row by row starting from the last row of the first virtual matrix in a descending order of row; then progressively writing the first location element in the data information logic block unit into the first virtual matrix row by row starting from the first column of the first virtual matrix in an ascending order of column, and skipping the locations occupied by the elements in the periodic report logic block unit; and when writing data into the second virtual matrix, first progressively writing the second element in the periodic feedback report logic block unit into predetermined locations of the second virtual matrix row by row starting from the last row of the second virtual matrix in a descending order of row; progressively writing the second location element in the data information logic block unit into the second virtual matrix row by row starting from the first row of the second virtual matrix in an ascending order of row, and skipping the locations occupied by the elements in the periodic report logic block unit; and reading out the data from the first and second virtual matrix, as to each virtual matrix, reading out the elements from the matrix column by column starting from the first column of the virtual matrix, within each column, successively reading out the same row by row in an ascending order of row, among the elements read out, constructing the first location element of a control and data information logic unit using the elements read out from the first virtual matrix, and constructing the second location element of the control and data information logic unit using the elements read out from the second virtual matrix, and for each element, reading out the same in its bit sequence to finally obtain the control and data information bit sequence.

The number of elements in the periodic feedback report logic unit is $H_1'$, the number of elements in the data information logic unit is $Q_{RI}'$, and the product of the number of rows and the number of columns in each generated virtual matrix is $(H_1'+Q_{RI}')/2$; if there is no SRS to be sent, when a subframe uses a conventional cyclic prefix structure, the number of columns of the virtual matrix is 12; and when the subframe uses an extended cyclic prefix structure, the number of columns of the virtual matrix is 10; if there is an SRS to be sent, when the subframe uses the conventional cyclic prefix structure, the number of columns of the virtual matrix is 11; and when the subframe uses the extended cyclic prefix structure, the number of columns of the virtual matrix is 9; and when the current subframe uses the conventional cyclic prefix, the predetermined locations refer to a virtual matrix array with the column numbers thereof being 1, 4, 7, 10; and when the current subframe uses the extended cyclic prefix, the predetermined locations refer to a virtual matrix array with the column numbers thereof being 0, 3, 5, 8.

The first location element and the second location element are a combination of one of the following: the first location element refers to the first half of elements in a corresponding logic unit, and the second location element refers to the second half of elements in the corresponding logic unit; the first location element refers to the second half of elements in a corresponding logic unit, and the second location element refers to the first half of elements in the corresponding logic unit; when the element ordering number in the corresponding logic unit starts from 0, the first location element refers to even elements in the corresponding logic unit, and the second location element refers to odd elements in the corresponding logic unit; and when the element ordering number in the corresponding logic unit starts from 1, the first location element refers to odd elements in the corresponding logic unit, and the second location element refers to even elements in the corresponding logic unit.

According to one aspect of the present invention, an apparatus for transmitting a periodic feedback report is provided, including: a coding module being configured to code a periodic feedback report to be transmitted and data information corresponding to a transmission block respectively and intercept the correspondingly coded information according to a target length, wherein the periodic feedback report includes one of the following information: a combined coding index of rank indicator (RI) information and first pre-coding matrix indicator (PMI-1) information, a combined coding index of the RI and pre-coding type indication (PTI) information, and the PMI-1; and a transmission module being configured to, when a transmission block corresponds to a single layer or multiple layers, carry out channel interleave on the coded information on the single layer or multiple layers to be transmitted on the transmission block, and transmit the interleaved information on a layer corresponding to a physical uplink shared channel (PUSCH).

The above transmission module includes: a mapping unit being configured to map the transmitted periodic feedback report onto two timeslots of one subframe, with the periodic feedback report being mapped onto an orthogonal frequency division multiplex (OFDM) symbol at a specific location in one subframe, with the OFDM at the specific location referring to an OFDM symbol adjacent to and separated from an OFDM symbol where a demodulation reference signal is located by an OFDM symbol.

The above coding module includes: a determination unit being configured to determine a periodic feedback report to be transmitted; a selecting unit being configured to select a transmission block to transmit the periodic feedback report, wherein the transmission block is a transmission block configured by a current uplink channel, there are one or two transmission blocks, with each transmission block having corresponding data information; and a coding unit being configured to code the determined periodic feedback report and the data information corresponding to the selected transmission block.

The above apparatus further includes: a generation unit being configured to generate a periodic feedback report logic unit and a data information logic unit using the periodic feedback report and data information corresponding to the transmission block coded by the coding unit in the form of modulation symbol; and the transmission module comprises: a sequence acquisition unit being configured to carry out channel interleave on the periodic feedback report logic unit and the data information logic unit on each of the transmission blocks to obtain a control and data information bit sequence.

The above transmission module includes: a first transmission unit being configured to, if the selecting unit selects one transmission block, place the control and data information bit sequence on the transmission block acquired by the sequence acquisition unit on a layer corresponding to the PUSCH for transmission; and a second transmission unit being configured to, if the selecting unit selects two transmission blocks, place the control and data information bit sequence on a first one of the two transmission blocks acquired by the sequence acquisition unit on a layer corresponding to the first transmission block on the PUSCH for transmission, and place the control and data information bit sequence on a second one of the two transmission blocks acquired by the sequence acquisition unit on a layer corresponding to the second transmission block on the PUSCH for transmission.

The above sequence acquisition unit includes: a sequence acquisition sub-unit being configured to, when a number of transport layers corresponding to the transmission block being transmitted on the PUSCH is 1, carry out channel interleave on the periodic feedback report logic unit and the data information logic unit to obtain a control and data information bit sequence.

The above sequence acquisition sub-unit includes: a first matrix generation sub-unit being configured to generate a virtual matrix according to a total number of the periodic report logic unit and the data information logic unit; a first data writing sub-unit being configured to, when writing data into the virtual matrix generated by the first matrix generation sub-unit, first progressively write elements in the periodic report logic unit into predetermined locations of the virtual matrix row by row starting from the last row of the virtual matrix in a descending order of row, within any row, successively write the same from left to right into respective columns of the predetermined locations; write elements in the data information logic unit into the virtual matrix row by row starting from the first row of the virtual matrix in an ascending order of row, within any row, successively write the same into locations except those locations already occupied by the elements in the periodic report logic unit in an order from left to right; and a first data readout sub-unit being configured to, when reading out the data from the virtual matrix written by the first data write sub-unit, read out the elements from that matrix column by column starting from the first column of the virtual matrix, within each column, successively read out the same row by row in an ascending order of row, and for each element, read out the same in its bit sequence to finally obtain the control and data information bit sequence.

The above sequence acquisition unit includes: a second matrix generation sub-unit being configured to, when a number of transport layers corresponding to the transmission block being transmitted on the PUSCH is 2, generate a periodic feedback report logic block unit and a data information logic block unit according to the periodic feedback report logic unit and the data information logic unit and generate a virtual matrix according to a total number of the periodic feedback report logic block unit and the data information logic block unit; a second data writing sub-unit being configured to, when writing data into the virtual matrix generated by the second matrix generation sub-unit, first progressively write elements in the periodic feedback report logic block unit into predetermined locations of the virtual matrix row by row starting from the last row of the virtual matrix in a descending order of row; and write elements in the data information logic block unit into the virtual matrix row by row starting from the first row of the virtual matrix in an ascending order of row, and skip the locations occupied by the elements in the periodic report logic block unit; and a second data readout sub-unit being configured to, when reading out the data from the virtual matrix written by the second data write sub-unit, read out the elements from that matrix column by column starting from the first column of the virtual matrix, within each column, successively reading out the same row by row in an ascending order of row, and for each element, reading out the same in its bit sequence to finally obtain the control and data information bit sequence.

The above second matrix generation sub-unit comprises: a construction sub-unit being configured to construct a first periodic feedback report logic sub-unit using a first location element in the periodic feedback report logic unit, and construct a second periodic feedback report logic sub-unit using a second location element in the periodic feedback report logic unit; and construct a first data information logic sub-unit using a first location element in the data information logic unit; and construct a second data information logic sub-unit using a second location element in the data information logic unit; and a logic block combination sub-unit being configured to combine the first and second periodic feedback report logic sub-units into a periodic feedback report logic block unit; and combine the first and second data information logic sub-units into a data information logic block unit.

The above sequence acquisition unit includes: a third matrix generation sub-unit being configured to, when a number of transport layers corresponding to the transmission block being transmitted on the PUSCH is 2, generate a virtual matrix according to the total number of the periodic feedback report logic unit and the data information logic unit; a third data writing sub-unit being configured to, when writing data into the virtual matrix generated by the third matrix generation sub-unit, write the first location element in the periodic feedback report logic unit and the first location element in the data information logic unit into the virtual matrix in the following manner: first write the first location element in the periodic report logic unit into predetermined locations of the virtual matrix in every other row starting from the second to the last row of the virtual matrix; then writE elements in the data information logic unit into the virtual matrix row by row starting from the first row of the virtual matrix in an ascending order of row, and skip the locations occupied by the elements in the periodic report logic unit; and a third data readout sub-unit being configured to, when reading out the data from the virtual matrix written by the first data write sub-unit, read out the elements from that matrix column by column starting from the first column of the virtual matrix, within each column, successively read out the same row by row in an ascending order of row, and for each element, read out the same in its bit sequence to finally obtain the control and data information bit sequence.

The above sequence acquisition unit includes: a fourth matrix generation sub-unit being configured to, when a number of transport layers corresponding to the transmission block being transmitted on the PUSCH is 2, generate two virtual matrixes according to the total number of the periodic feedback report logic unit and the data information logic unit, which are respectively a first virtual matrix and a second virtual matrix; a fourth data writing sub-unit being configured to, when writing data into the first virtual matrix, first progressively write the first location element in the periodic feedback report logic block unit into predetermined locations of the first virtual matrix row by row starting from the last row of the first virtual matrix in a descending order of row; write the first location element in the data information logic block unit into the first virtual matrix row by row starting from the first column of the first virtual matrix in an ascending order of column, and skip the locations occupied by the elements in the periodic report logic block unit; and when writing data into the second virtual matrix, first progressively write the second element in the periodic feedback report logic block unit into predetermined locations of the second virtual matrix row by row starting from the last row of the second virtual matrix in a descending order of row; write the second location element in the data information logic block unit into the second virtual matrix row by row starting from the first row of the second virtual matrix in an ascending order of row, and skip the locations occupied by the elements in the periodic report logic block unit; and a fourth data readout sub-unit being configured to read out the data from the first and second virtual matrix, as to each virtual matrix, read out the elements from the matrix column by column starting from the first column of the virtual matrix, within each column, successively read out the same row by row in an ascending order of row, among the elements read out, construct the first location element of a control and data information logic unit using the elements read out from the first virtual matrix, and construct the second location element of the control and data information logic unit using the elements read out from the second virtual matrix, and for each element, read out the same in its bit sequence to finally obtain the control and data information bit sequence.

By way of the present invention, the problem that the periodic feedback report cannot be transmitted over the PUSCH is solved by carrying out processing such as coding and interleaving on the periodic feedback report and the data information, optimizing the system.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

Figure 1:
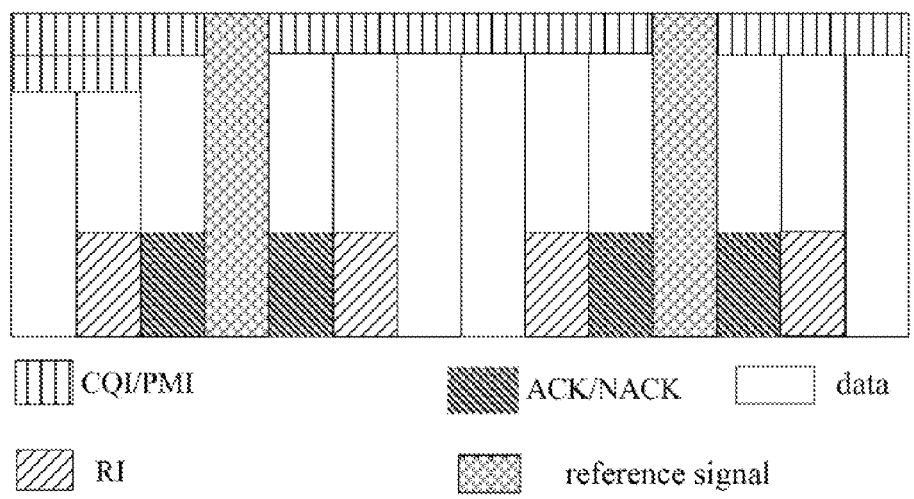
FIG. 1 is a schematic diagram of an uplink control signaling being transmitted over the PUSCH in the LTE system according to relevant art.
Figure 2:
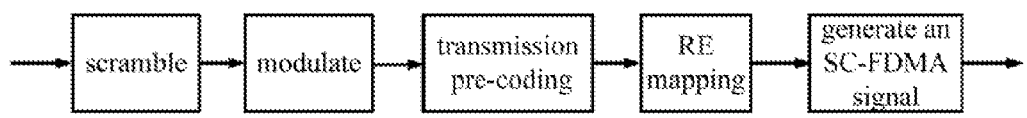
FIG. 2 is a schematic diagram of a PUSCH transmission mode in the LTE system according to relevant art.

The present invention will be described hereinafter in detail with reference to the accompanying drawings and in conjunction with embodiments. It needs to note that the embodiments of the present application and the features in the embodiments can be combined with each other if there is no conflict.

The embodiments of the present invention provide a method and an apparatus for transmitting a periodic feedback report on a physical uplink shared channel (PUSCH), wherein the periodic feedback report includes one of the following: a combined coding index of an uplink control signaling RI and PMI-1, a combined coding index of RI and PTI, PMI-1, etc., which can solve the problem that when the PUSCH in the LTE-A system uses or does not use spatial multiplexing, the uplink control signaling cannot be transmitted on the PUSCH.

Hereinafter, relevant concepts of dual codebook, PMI-1 and PMI-2 will be introduced simply.

The long term evolution advanced (LTE-A) system, as an evolution standard of the LTE, supports a larger system bandwidth (up to 100 MHz) and is backward compatible with the existing standard of the LTE. In order to obtain higher cell average spectrum efficiency and improve the cell edge coverage and throughput, the LTE-A, on the basis of the existing LTE system, supports up to 8 antennae in the downlink and proposes some feedback enhanced technologies regarding codebook feedback, which is mainly to enhance the feedback precision of the codebook and compress the overhead using the time relevance and/or frequency domain relevance of the channel information. This technology can improve the spectrum utilization rate of the International Mobile Telecommunications-Advance (IMT-Advance) system and relieves the shortage of spectrum resources. At the same time, regarding that the main application of 8 antennae is dual polarization, the design and enhancement of the codebook also needs to sufficiently take the characteristic of dual polarized channel into account.

The main idea of such enhanced feedback technology for the codebook is as follows: increase the overhead of PMI feedback relative to the feedback of LTE, and utilize the feedback of two PMIs to together represent the state information of the channel, mainly including two implementations: define a dual codebook and dual PMI feedback, or define a single codebook and dual PMI feedback equivalent to dual codebook. Defining a dual codebook and dual PMI feedback can be further described as:

1) the pre-coding/feedback structure of one subband is composed of two matrixes.

2) each matrix in the two matrixes belongs to a single codebook. The codebook is known in advance to the eNode B and UE simultaneously. The codeword which is fed back may vary at different time and different subbands.

3) one matrix represents the attribute of wideband or long time channel. Another matrix represents the attribute of a determined frequency band or a short time channel.

4) the matrix codebook used is represented in the form of limited countable matrix sets, and as to the UE and eNode B, each matrix is known.

5) one matrix therein can be a fixed matrix and need not be fed back. At this moment, it is equivalent to degenerate to single codebook feedback (which may be used in the case of non-relevant channel with high rank and low rank).

It can be seen that a structure based on dual codebook is proposed regarding the feedback of channel information, and it can be further described as:

as to one subband or a plurality of combined subbands which need to feed back the channel information, the UE feeds back information about two PMIs to the eNode B (in some cases, it may not be carried out by feedback, one PMI can be pre-defined as a fixed value and not be fed back), which are respectively PMI-1 and PMI-2, wherein PMI-1 corresponds to codeword W1 in a codebook C1, and PMI-2 corresponds to codeword W2 in another codebook C2. The eNode B end has the same information about C1 and C2, finds the corresponding codeword W1 and W2 from the corresponding codebook C1 and C2 after having received PMI-1 and PMI-2, and obtains channel information W by calculation W=F(W1, W2) according to an agreed function rule F.

The above design rule of dual codebook is a particular codebook form in the LTE-A. During practical implementation, it only needs to define codebooks corresponding to W1 and W2, however, there is actually a virtual codebook corresponding to W, and many performance aspects in the design take the codebook corresponding to W into account. Furthermore, the design of codebook feedback mainly has two important parts: the first one is the particular structure, overhead and particular codeword of W, which directly affects the feedback performance of dual codebook (although the particularly defined feedback form is to feed W1 and W2 back but not directly feed W back), and this part is relatively similar to the form of single codebook and dual codebook. The second important part is how to split W into 2 codebooks so as to represent the properties which can better adapt to the time domain/frequency domain change of the channel and effectively save the overhead. This belongs to the consideration of saving overhead for dual codebook, and there is no such consideration in single codebook.

In addition to the above dual codebook implementation, there is still a single codebook feedback mode equivalent to the use of dual codebook and dual PMI for feedback, and a single codebook and dual PMI feedback equivalent to dual codebook are defined. As to dual PMI feedback, the channel information W is obtained by calculation W=F(PMI-1, PMI-2) according to the agreed function rule F.

For example, as to Rank=r, r is an integral number, and the difference from the previous 4Tx codebook lies in the fact that: when a single codebook equivalent to this dual codebook is used to carry out feedback, the feedback of 2 PMIs in the codeword of the codebook corresponding to the feedback is needed to represent the information thereabout, and the single codebook equivalent to dual codebook is generally represented as the following Table 6.

TABLE 6

|  |  | $i_2$ |  |  |  |
|---|---|---|---|---|---|
|  |  | 0 | 1 | ... | N2 |
| $i_1$ | 0 | $W_{i_1,i_2}$ | $W_{i_1,i_2}$ | $W_{i_1,i_2}$ | $W_{i_1,i_2}$ |
|  | 1 | $W_{i_1,i_2}$ | $W_{i_1,i_2}$ | $W_{i_1,i_2}$ | $W_{i_1,i_2}$ |
|  | 2 | $W_{i_1,i_2}$ | $W_{i_1,i_2}$ | $W_{i_1,i_2}$ | $W_{i_1,i_2}$ |
|  | 3 | $W_{i_1,i_2}$ | $W_{i_1,i_2}$ | $W_{i_1,i_2}$ | $W_{i_1,i_2}$ |
|  | ... | $W_{i_1,i_2}$ | $W_{i_1,i_2}$ | $W_{i_1,i_2}$ | $W_{i_1,i_2}$ |
|  | N−1 | $W_{i_1,i_2}$ | $W_{i_1,i_2}$ | $W_{i_1,i_2}$ | $W_{i_1,i_2}$ |
|  | N1 | $W_{i_1,i_2}$ | $W_{i_1,i_2}$ | $W_{i_1,i_2}$ | $W_{i_1,i_2}$ |

Herein, $W_{i_1,i_2}$ is a codeword indicated by $i_1$ and $i_2$ together, which generally can be written into a function form $W(i_1,i_2)$, and it only needs to determine $i_1$ and $i_2$.

For example, when r=1, it is as shown in Table 7.

$$\phi_n = e^{j\pi n/2}$$

$$v_m = [1\ e^{j2\pi m/32}\ e^{j4\pi m/32}\ e^{j6\pi m/32}]^T$$

TABLE 7

| $i_1$ | $i_2$ | | | | | | | |
|---|---|---|---|---|---|---|---|---|
|  | 0 | 1 | 2 | 3 | 4 | 5 | 6 | 7 |
| 0-15 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ | $W^{(1)}_{2i_1+1,1}$ | $W^{(1)}_{2i_1+1,2}$ | $W^{(1)}_{2i_1+1,3}$ |

| $i_1$ | $i_2$ | | | | | | | |
|---|---|---|---|---|---|---|---|---|
|  | 8 | 9 | 10 | 11 | 12 | 13 | 14 | 15 |
| 0-15 | $W^{(1)}_{2i_1+2,0}$ | $W^{(1)}_{2i_1+2,1}$ | $W^{(1)}_{2i_1+2,2}$ | $W^{(1)}_{2i_1+2,3}$ | $W^{(1)}_{2i_1+3,0}$ | $W^{(1)}_{2i_1+3,1}$ | $W^{(1)}_{2i_1+3,1}$ | $W^{(1)}_{2i_1+3,2}$ |

Where, $W^{(1)}_{m,n} = \dfrac{1}{\sqrt{8}}\begin{bmatrix} v_m \\ \varphi_n v_m \end{bmatrix}$ This mode is actually equivalent to dual codebook and dual PMI, and the only difference lies in that two codebooks C1 and C2 will no longer be defined in this method, instead, a codebook corresponding to W composed of a dual codebook and the function relationship thereof is defined, i.e. the virtual codebook actually replaces C1 and C2.

Hereinafter, the concept of combined coding of RI and PMI-1 will be introduced simply:

the combined coding of RI and PMI-1 is to code RI and PMI-1 uniformly, and each combined coding index uniquely indicates a first pre-coding index PMI-1, different combined coding index intervals (set) uniquely represent different values of RI, and it is allowed that a small number of coding indexes represent default. The combined coding index of RI and PMI-1 needs be represented using n bits, with n being a positive integral number greater than or equal to 1.

The following table is an example of combined coding of RI and W1, as shown in Table 8:

TABLE 8

| Index | Report Type B: |
|---|---|
| 0 | RI = 1, PMI-$1_0$ |
| 1 | RI = 1, PMI-$1_1$ |
| 2 | RI = 1, PMI-$1_2$ |
| 3 | RI = 1, PMI-$1_3$ |
| 4 | RI = 2, PMI-$1_4$ |

TABLE 8-continued

| Index | Report Type B: |
|---|---|
| 5 | RI = 2, PMI-1$_5$ |
| 6 | RI = 2, PMI-1$_6$ |
| 7 | RI = 2, PMI-1$_7$ |
| 8 | RI = 3, PMI-1$_0$ |
| 9 | RI = 4, PMI-1$_0$ |
| 10 | RI = 5, PMI-1$_0$ |
| 11 | RI = 6, PMI-1$_0$ |
| 12 | RI = 7, PMI-1$_0$ |
| 13 | RI = 8, PMI-1$_0$ |
| 14 | Reserved |
| 15 | Reserved |

Where, PMI-1$_i$ represents PMI-1=i, here, i represents an integral number from 0 to 7; and PMI-1 can be defaulted when the index is equal to 8 to 13.

Hereinafter, the periodic feedback report described in the embodiments of the present invention will be introduced simply:

in LTE-A Release 10, the PUCCH Mode 2-1 feedback mode in LTE Rel.8 will be extended, and the pre-coding matrix is determined by 3 subframes on the basis of the latest RI report. The format of the report includes:

a first report including an RI and a 1-bit pre-coding type indication information PTI;

a second report including two situations: when PTI=0, PMI-1 will be reported; and when PTI=1, the CQI of the wideband and the PMI-2 of the wideband will be reported;

a third report including two situations: when PTI=0, the CQI of the wideband and the PMI-2 of the wideband will be reported; and when PTI=1, the CQI of the subband and the PMI-2 of the subband and so on will be reported; and each report occupies one PUCCH and belongs to a feedback periodic report. In fact, among these reports, the first report including RI and PTI and the second report when PTI=0 are very important, and other reports rely on these two reports. If errors occur in these two reports, we cannot obtain basic channel information. The first report including RI and PTI and the second report when PTI=0 are periodic reports to be transmitted in the present invention.

In LTE-A Release 10, the PUCCH Mode 1-1 feedback mode in LTE Rel.8 will be extended, and the pre-coding matrix is determined by 2 subframes. The format of the reports includes:

a first report including combined coding of RI and PMI-1;

a second report including wideband CQI and wideband PMI-2;

each report occupies one PUCCH and belongs to a feedback periodic report. In fact, among these reports, the first report including the combined coding of RI and PMI-1 is very important, and other reports rely on this report. If errors occur in this report, we cannot obtain basic channel information. The first report including the combined coding of RI and PMI-1 is the report to be transmitted in the present invention.

In the embodiments of the present invention, the combined index of RI and PMI-1 has two forms: one is that there is only one index which not only can determine the value of RI but also can determine the value of PMI-1; and another is a combination of two indexes with one therein determining the value of RI and another determining the value of PMI-1; and in the embodiments of the present invention, the combined index of RI and PTI has two forms: one is that there is only one index which not only can determine the value of RI but also can determined the value of PTI; and another is a combination of two indexes with one therein determining the value of RI and another determining the value of PTI.

Embodiment 1

Figure 3:
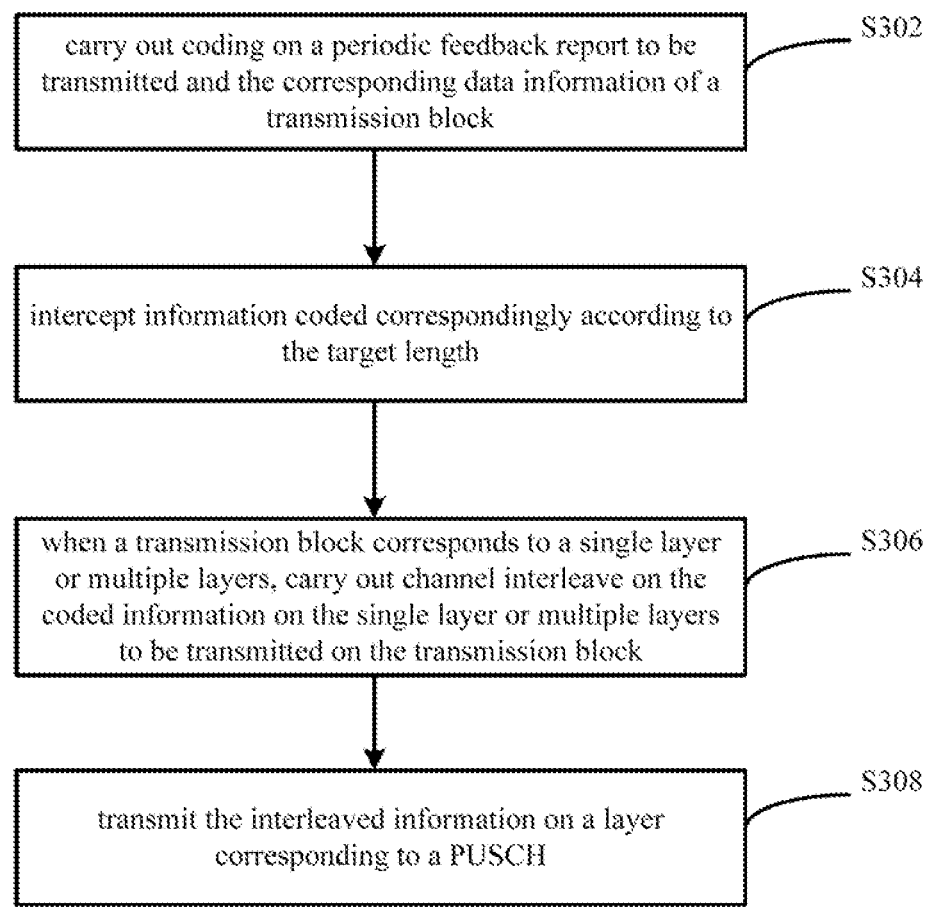
FIG. 3 is a flowchart of a method for transmitting a periodic feedback report according to embodiment 1 of the present invention.

FIG. 3 is a flowchart of a method for transmitting a periodic feedback report according to the embodiments of the present invention, which method includes the following steps:

Step S302: carry out coding on the periodic feedback report to be transmitted and the data information corresponding to the transmission block respectively;

wherein, the periodic feedback report includes one of the following information: a combined coding index of rank indicator (RI) information and first pre-coding matrix indicator (PMI-1) information, a combined coding index of the RI and pre-coding type indication (PTI) information, and the PMI-1;

the coding can be carried out according to the following mode: determining a periodic feedback report to be transmitted and selecting transmission block to transmit the periodic feedback report, i.e. target transmission block, wherein the transmission block is configured for a current uplink channel, and there is one or two transmission blocks, with each transmission block having corresponding data information thereon; and coding the determined periodic feedback report and the data information corresponding to the transmission block respectively.

The data information corresponding to the transmission block in this embodiment can be directly referred to as transmission block, i.e. transmission block refers to data information.

The manner of selecting transmission block can be made reference to the method in the related art, for example, select the transmission blocks configured by the system for the uplink channel as the target transmission blocks.

Step S304: intercept correspondingly coded information according to the target length;

Step S306: when a transmission block corresponds to a single layer or multiple layers, carry out channel interleave on the coded information to be transmitted on the single layer or the plurality of layers on the transmission block; and the coded information on the single layer or multiple layers comprises one of the following: coded periodic feedback report information, a combination of coded data information and coded periodic feedback report information.

Step S308: transmit the interleaved information on the corresponding layer of the PUSCH.

In this embodiment, when carrying out channel interleave processing and transmission processing, the transmitted periodic feedback report can be mapped onto two timeslots of one subframe, with the periodic feedback report being mapped onto an orthogonal frequency division multiplex (OFDM) symbol at a specific location in one subframe, with the OFDM at the specific location referring to an OFDM symbol adjacent to and separated from an OFDM symbol where a demodulation reference signal is located by an OFDM symbol.

Placing the periodic feedback report on a specific location OFDM symbol on a subframe for transmission not only ensures high reliable transmission of the periodic feedback report on the PUSCH but also ensures the compatibility with the original system.

Preferably, after step S302, the method further includes: generating a periodic feedback report logic block unit and a data information logic block unit according to the coded periodic feedback report and the data information corresponding to the data information in the form of modulation symbol; and accordingly, step S306 includes: carrying out channel interleave on the periodic feedback report logic unit and the data information logic unit on each transmission block to obtain a control and data information bit sequence.

Preferably, step S308 includes: if one transmission block is selected, then placing the control and data information bit sequence on the transmission block on a layer corresponding to the PUSCH for transmission; and if two transmission blocks are selected, then placing the control and data information bit sequence on a first one of the two transmission blocks on a layer on the PUSCH corresponding to the first transmission block for transmission; and placing the control and data information bit sequence on a second one of the two transmission blocks on a layer on the PUSCH corresponding to the second transmission block for transmission.

There are lots of acquisition modes of the above control and data information bit sequence, and the particular acquisition mode can be determined according to the particular number of the transport layers, for example:

mode I: when a number of transport layers corresponding to the transmission block being transmitted on the PUSCH is 1, carrying out channel interleave on the periodic feedback report logic unit and the data information logic unit to obtain a control and data information bit sequence.

The particular process of the mode I is as follows: generating a virtual matrix according to the total number of the periodic report logic unit and the data information logic unit; when writing data into the virtual matrix, first progressively writing elements in the periodic report logic unit into predetermined locations of the virtual matrix row by row starting from the last row of the virtual matrix in a descending order of row, within any row, successively writing the same from left to right into respective columns of the predetermined locations; writing elements in the data information logic unit into the virtual matrix row by row starting from the first row of the virtual matrix in an ascending order of row, within any row, successively writing the same into locations except those locations already occupied by the elements in the periodic report logic unit in an order from left to right; and when reading out the data from the virtual matrix, reading out the elements from that matrix column by column starting from the first column of the virtual matrix, within each column, successively reading out the same row by row in an ascending order of row, and for each element, reading out the same in its bit sequence to finally obtain the control and data information bit sequence.

As to the generated virtual matrix, the determination mode of the row and column thereof is as follows: the number of elements in the periodic feedback report logic block unit is $M_{RP}$, the number of elements in the data information logic block unit is M, and the product of the number of rows and the number of columns in the generated virtual matrix is $(M+M_{RI})$; if there is no measurement reference signal (SRS) to be sent, when the subframe uses the conventional cyclic prefix structure, the number of columns of the virtual matrix is 12; and when the subframe uses the extended cyclic prefix structure, the number of columns of the virtual matrix is 10; if there is a measurement reference signal (SRS) to be sent, when the subframe uses the conventional cyclic prefix structure, the number of columns of the virtual matrix is 11; and when the subframe uses the extended cyclic prefix structure, the number of columns of the virtual matrix is 9.

Mode II: when a number of transport layers corresponding to the transmission block being transmitted on the PUSCH is 2, generating a periodic feedback report logic block unit and a data information logic block unit according to the periodic feedback report logic unit and the data information logic unit; generating a virtual matrix according to the total number of the periodic feedback report logic unit and the data information logic unit; when writing data into the virtual matrix generated by the matrix generation sub-unit, first progressively write elements in the periodic feedback report logic block unit into predetermined locations of the virtual matrix row by row starting from the last row of the virtual matrix in a descending order of row; and write elements in the data information logic block unit into the virtual matrix row by row starting from the first row of the virtual matrix in an ascending order of row, and skipping the locations occupied by the elements in the periodic report logic block unit; and when reading out the data from the virtual matrix, read out the elements from that matrix column by column starting from the first column of the virtual matrix, within each column, successively reading out the same row by row in an ascending order of row, and for each element, reading out the same in its bit sequence to finally obtain the control and data information bit sequence.

In this case, the generating a periodic feedback report logic block unit and a data information logic block unit according to the periodic feedback report logic unit and the data information logic unit comprises: constructing a first periodic feedback report logic sub-unit using a first location element in the periodic feedback report logic unit, and constructing a second periodic feedback report logic sub-unit using a second location element in the periodic feedback report logic unit; constructing a first data information logic sub-unit using a first location element in the data information logic unit; and constructing a second data information logic sub-unit using a second location element in the data information logic unit; and combining the first and second periodic feedback report logic sub-units into a periodic feedback report logic block unit; and combining the first and second data information logic sub-units into a data information logic block unit.

Provided that the first logic sub-unit is $[q_{10}, q_{11}, q_{12}, \ldots q_{1m}]$, the second logic sub-unit is $[q_{20}, q_{21}, q_{22}, \ldots q_{2m}]$, and the generated logic block unit is $[q_0, q_1, q_2, \ldots q_m]$, wherein $q_i$ is a matrix composed of $q_{1i}$ and $q_{2i}$. The obtaining a logic block sub-unit from the logic sub-unit is not only suitable for obtaining a data logic block sub-unit from a data logic sub-unit but also suitable for obtaining a periodic feedback report logic block sub-unit from a periodic feedback report logic subunit. Where, m=2 or 4, or 6.

As to the generated virtual matrix, the determination mode of the row and column thereof is as follows: the number of elements in the periodic feedback report logic block unit is $M_{RP}$, the number of elements in the data information logic block unit is M, and the product of the number of rows and the number of columns in the generated virtual matrix is $(M+M_{RI})$; if there is no measurement reference signal (SRS) to be sent, when the subframe uses the conventional cyclic prefix structure, the number of columns of the virtual matrix is 12; and when the subframe uses the extended cyclic prefix structure, the number of columns of the virtual matrix is 10; if there is a measurement reference signal (SRS) to be sent, when the subframe uses the conventional cyclic prefix structure, the number of columns of the virtual matrix is 11; and when the subframe uses the extended cyclic prefix structure, the number of columns of the virtual matrix is 9.

Mode III: when a number of transport layers corresponding to the transmission block being transmitted on the PUSCH is 2, generate a virtual matrix according to the total number of the periodic feedback report logic unit and the data information logic unit; when writing data into the virtual matrix, write the first location element in the periodic feedback report logic unit and the first location element in the data information logic unit into the virtual matrix in the following manner: first writing the first location element in the periodic feedback report logic unit into predetermined locations of the virtual matrix in every other row starting from the second to the last row of the virtual matrix; then writing the first location element in the data information logic unit into the virtual matrix in every other row starting from the first row of the virtual matrix in an ascending order of row, and skipping the locations occupied by the elements in the periodic report logic unit; and when reading out the data from the virtual matrix, read out the elements from that matrix column by column starting from the first column of the virtual matrix, within each column, successively reading out the same row by row in an ascending order of row, and for each element, read out the same in its bit sequence to finally obtain the control and data information bit sequence.

As to the generated virtual matrix in this mode, the determination mode of the row and column thereof is as follows: the number of elements in the periodic feedback report logic block unit is $H_1'$, the number of elements in the data information logic block unit is $Q_{RI}'$, and the product of the number of rows and the number of columns in the generated virtual matrix is $(H_1'+Q_{RI}')$; if there is no measurement reference signal (SRS) to be sent, when the subframe uses the conventional cyclic prefix structure, the number of columns of the virtual matrix is 12; and when the subframe uses the extended cyclic prefix structure, the number of columns of the virtual matrix is 10; if there is a measurement reference signal (SRS) to be sent, when the subframe uses the conventional cyclic prefix structure, the number of columns of the virtual matrix is 11; and when the subframe uses the extended cyclic prefix structure, the number of columns of the virtual matrix is 9.

Mode IV: when a number of transport layers corresponding to the transmission block being transmitted on the PUSCH is 2, generating two virtual matrixes according to a total number of the periodic feedback report logic unit and the data information logic unit, which are respectively a first virtual matrix and a second virtual matrix;

when writing data into the first virtual matrix, first progressively writing the first location element in the periodic feedback report logic block unit into predetermined locations of the first virtual matrix row by row starting from the last row of the first virtual matrix in a descending order of row; then progressively writing the first location element in the data information logic block unit into the first virtual matrix row by row starting from the first column of the first virtual matrix in an ascending order of column, and skipping the locations occupied by the elements in the periodic report logic block unit; and when writing data into the second virtual matrix, first progressively writing the second element in the periodic feedback report logic block unit into predetermined locations of the second virtual matrix row by row starting from the last row of the second virtual matrix in a descending order of row; then progressively writing the second location element in the data information logic block unit into the second virtual matrix row by row starting from the first row of the second virtual matrix in an ascending order of row, and skipping the locations occupied by the elements in the periodic report logic block unit; and reading out the data from the first and second virtual matrix, as to each virtual matrix, reading out the elements from the matrix column by column starting from the first column of the virtual matrix, within each column, successively reading out the same row by row in an ascending order of row, among the elements read out, constructing the first location element of a control and data information logic unit using the elements read out from the first virtual matrix, and constructing the second location element of the control and data information logic unit using the elements read out from the second virtual matrix, and for each element, reading out the same in its bit sequence to finally obtain the control and data information bit sequence.

As to the generated virtual matrix in this mode, the determination mode of the row and column thereof is as follows: the number of elements in the periodic feedback report logic block unit is $H_1'$, the number of elements in the data information logic block unit is $Q_{RI}'$, and the product of the number of rows and the number of columns in each generated virtual matrix is $(H_1'+Q_{RI}')/2$; if there is no SRS to be sent, when the subframe uses the conventional cyclic prefix structure, the number of columns of the virtual matrix is 12; and when the subframe uses the extended cyclic prefix structure, the number of columns of the virtual matrix is 10; if there is an SRS to be sent, when the subframe uses the conventional cyclic prefix structure, the number of columns of the virtual matrix is 11; and when the subframe uses the extended cyclic prefix structure, the number of columns of the virtual matrix is 9.

The above first location element and second location element are a combination of one of the following:

the first location element refers to the first half of elements in a corresponding logic unit, and the second location element refers to the second half of elements in the corresponding logic unit;

the first location element refers to the second half of elements in a corresponding logic unit, and the second location element refers to the first half of elements in the corresponding logic unit;

when the element ordering number in the corresponding logic unit starts from 0, the first location element refers to even elements in the corresponding logic unit, and the second location element refers to odd elements in the corresponding logic unit; and when the element ordering number in the corresponding logic unit starts from 1, the first location element refers to odd elements in the corresponding logic unit, and the second location element refers to even elements in the corresponding logic unit.

In this embodiment, by way of carrying out coding, interleaving, etc. on the periodic feedback report and data information, it is achieved that the periodic feedback report can be transmitted on the PUSCH in the LTE-A system, solving the problem that the periodic feedback report cannot be transmitted on the PUSCH and optimizing the system.

Embodiment 2

Figure 4:
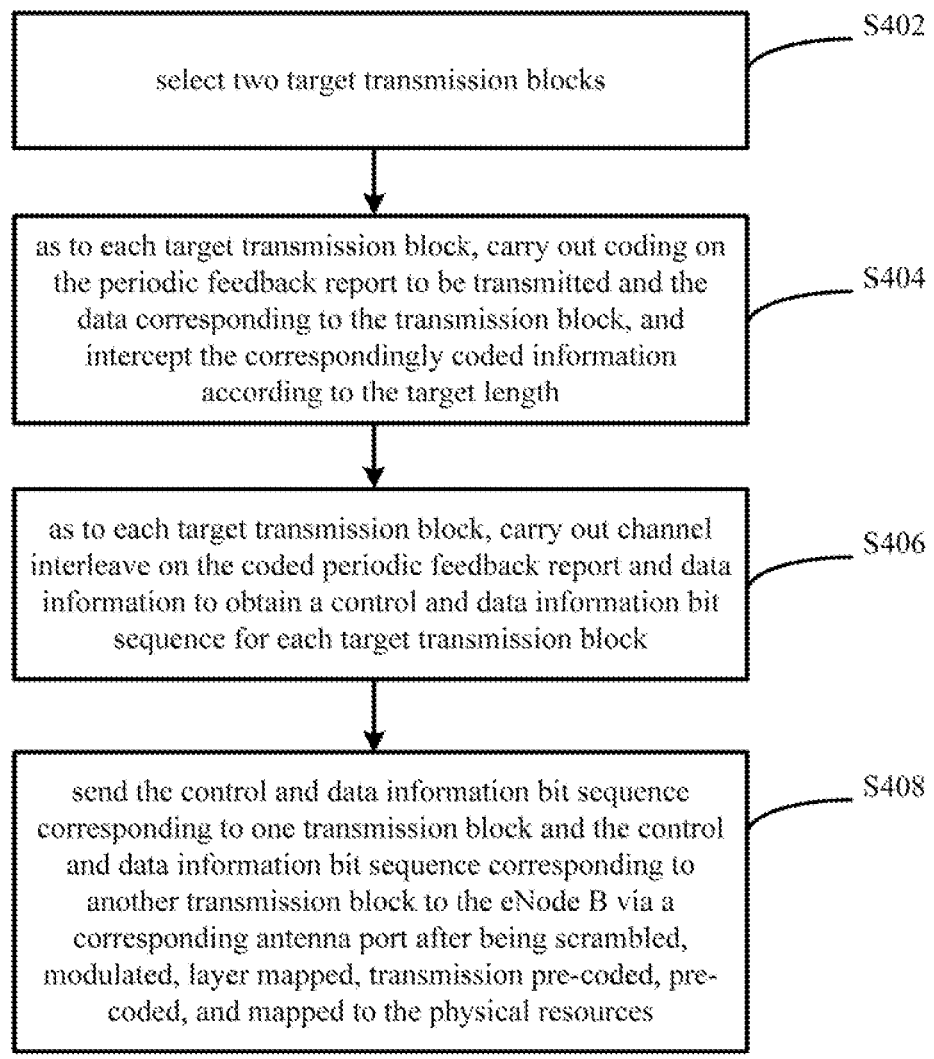
FIG. 4 is a flowchart of a method for transmitting a periodic feedback report according to embodiment 2 of the present invention.

This embodiment corresponds to the situation that there are two configured transmission blocks and each transmission block has data, and FIG. 4 is a flowchart of a method for transmitting a periodic feedback report according to the embodiments of the present invention, which periodic feedback report is transmitted on the PUSCH, and it mainly includes the following process (steps S402-S408):

Step S402: select two target transmission blocks;

in this embodiment, currently there are two transmission blocks in the uplink, then both of these two transmission blocks are target transmission blocks.

Step s404: as to each target transmission block, carry out coding on the periodic feedback report to be transmitted and the data corresponding to the transmission block, and intercept the correspondingly coded information according to the target length;

Step S406: as to each target transmission block, carry out channel interleave on the coded periodic feedback report and data information to obtain a control and data information bit sequence for each target transmission block;

Step S408: send the control and data information bit sequence corresponding to one transmission block and the control and data information bit sequence corresponding to another transmission block to the eNode B via a corresponding antenna port after being scrambled, modulated, layer mapped, transmission pre-coded, pre-coded, and mapped to the physical resources.

It needs to note that this embodiment further includes the situation that the scrambling occurs before the interleaving.

In this case, the periodic feedback report includes one of the following information: a combined coding index of rank indicator information and first pre-coding indication information, a combined coding index of the RI and pre-coding type indication information, and the PMI-1.

In this embodiment, the channel interleave is combined with the resource element mapped for PUSCH to achieve the mapping with priority time, and this mapping transforms a modulation symbol into a sending waveform and at the same time ensures that the transmitted periodic feedback report is on two timeslots of one subframe, the transmitted periodic feedback report is mapped to an OFDM symbol at a specific location, with the OFDM symbol at the specific location referring to an OFDM symbol adjacent to the OFDM symbol where the demodulation reference signal is located spaced with one OFDM symbol.

Preferably, after step S404, the method further includes: generating a periodic feedback report logic block unit and a data information logic block unit according to the coded periodic feedback report and the data information corresponding to the data information in the form of modulation symbol; and accordingly, step S406 includes: carrying out channel interleave on the periodic feedback report logic unit and the data information logic unit on each transmission block to obtain a control and data information bit sequence.

Furthermore, the acquisition mode of the above control and data information bit sequence includes the following two situations:

Situation I: when the target transmission block is transmitted on the PUSCH, the number of the corresponding transport layers is M=1:

generate a virtual matrix according to the logic unit indicated by the rank and data information logic unit, provided that the number of elements in the data information logic unit is $H_1'$, the number of elements in the periodic report logic unit logic unit is $Q_{RI}'$, and the product of the number of rows and the number of columns of the generated virtual matrix is $(H_1'+Q_{RI}')$;

when a subframe uses a conventional cyclic prefix structure, the number of columns of the virtual matrix is 12; and when the subframe uses an extended cyclic prefix structure, the number of columns of the virtual matrix is 10; if there is a measurement reference signal (SRS) to be sent, when the subframe uses the conventional cyclic prefix structure, the number of columns of the virtual matrix is 11; and when the subframe uses the extended cyclic prefix structure, the number of columns of the virtual matrix is 9;

when writing data, first progressively write elements in the periodic report logic unit into predetermined locations of the virtual matrix row by row starting from the last row of the virtual matrix in a descending order of row (provided that the number of rows is n, i.e. the writing order is the nth row, the (n−1)th row, the (n−2)th row, until the writing of all the elements in the periodic report logic unit is completed), when the current subframe uses the conventional cyclic prefix, progressively write the elements in the periodic report logic unit into the virtual matrix array with the column numbers thereof being 1, 4, 7, 10 according to a rule; and when the current subframe uses the extended cyclic prefix, write the elements in the periodic report logic unit into the virtual matrix array with the column numbers thereof being 0, 3, 5, 8 according to a rule in an order of descending row; then write elements in the data information logic block unit into the virtual matrix row by row starting from the first row of the virtual matrix in an ascending order of row, wherein skip the locations occupied by the elements in the periodic report logic block unit; and when reading out the data from the virtual matrix, reading out the elements from that matrix column by column starting from the first column of the virtual matrix, within each column, successively reading out the same row by row in an ascending order of row, and for each element, reading out the same in its bit sequence to finally obtain the control and data information bit sequence.

Situation II: when the target transmission block is transmitted on the PUSCH, the number of the corresponding transport layers is M=2, including the following two methods:

Method I: the first location element in the periodic report logic unit constructs a first rank indicator information logic sub-unit, the second location element in the periodic report logic unit constructs a second rank indicator information logic sub-unit, the first location element in the data information logic unit constructs a first data information logic sub-unit, and the second location element in the data information logic unit constructs a second data information logic sub-unit, and group each logic sub-unit into each logic block unit to obtain a periodic report logic block unit and a data information logic block unit.

The mode is as follows: provided that the first logic sub-unit is $[q_{10}, q_{11}, q_{12}, \ldots q_{1m}]$, the second logic sub-unit is $[q_{20}, q_{21}, q_{22}, \ldots q_{2m}]$, and the generated logic block unit is $[q_0, q_1, q_2, \ldots q_m]$, wherein $q_i$ (i=1:m) is a matrix composed of $q_{1i}$ and $q_{2i}$, wherein $q_{1i}$ is the first row (or the first column) of the matrix $q_i$, and $q_{2i}$ is the second row (or the second column) of the matrix $q_i$.

Then, generate a virtual matrix according to a total number of the periodic report logic block unit and data information logic block unit, provided that the number of elements in the periodic report logic block unit is $M_{RI}$, the number of elements in the data information logic block unit is M, the product of the number of rows and the number of columns in the generated virtual matrix is $(M+M_{RI})$; when a subframe uses a conventional cyclic prefix structure, the number of columns of the virtual matrix is 12; and when the subframe uses an extended cyclic prefix structure, the number of columns of the virtual matrix is 10; if there is an SRS to be sent, when the subframe uses the conventional cyclic prefix structure, the number of columns of the virtual matrix is 11; and when the subframe uses the extended cyclic prefix structure, the number of columns of the virtual matrix is 9;

when writing data, first progressively write elements in the periodic feedback report logic block unit into predetermined locations of the virtual matrix row by row starting from the last row of the virtual matrix in a descending order of row, i.e. when the current subframe uses a conventional cyclic prefix structure, then write the elements in the periodic report logic block unit into the virtual matrix array with the column numbers thereof being 1, 4, 7, 10 according to a rule; and when the current subframe uses the extended cyclic prefix, write the elements in the periodic report logic unit into the virtual matrix array with the column numbers thereof being 0, 3, 5, 8 according to a rule in an order of descending row; then write elements in the data information logic block unit into the virtual matrix row by row starting from the first row of the virtual matrix in an ascending order of row, wherein skip the locations occupied by the elements in the periodic report logic block unit; and then progressively write elements in the data information logic block unit into the virtual matrix row by row starting from the first row of the virtual matrix in an ascending order of row, and skip the locations occupied by the elements in the periodic report logic block unit; and when reading out the data from the virtual matrix, reading out the elements from that matrix column by column starting from the first column of the virtual matrix, within each column, successively reading out the same row by row in an ascending order of row, and for each element, reading out the same in its bit sequence to finally obtain the control and data information bit sequence.

Method II: generate two virtual matrixes according to the total number of the periodic report logic unit and data information logic unit, which are respectively a first virtual matrix and a second virtual matrix; provided that the number of elements is $H_1'$, the number of elements in the periodic feedback report logic unit is $Q_{RI}'$, and the product of the number of rows and the number of columns in each generated virtual matrix is $(H_1'+Q_{RI}')$; when a subframe uses a conventional cyclic prefix structure, the number of columns of the virtual matrix is 12; and when the subframe uses an extended cyclic prefix structure, the number of columns of the virtual matrix is 10; if there is a measurement reference signal (SRS) needed to be sent, when the subframe uses the conventional cyclic prefix structure, the number of columns of each virtual matrix is 11; and when the subframe uses the extended cyclic prefix structure, the number of columns of each virtual matrix is 9; and when writing data into the first virtual matrix, first progressively writing the first location element in the periodic feedback report logic block unit into predetermined locations of the first virtual matrix row by row starting from the last row of the first virtual matrix in a descending order of row; i.e. if the current subframe uses the extended cyclic prefix, write the first location element in the periodic report logic unit into the first virtual matrix array with the column numbers thereof being 1, 4, 7, 10 according to a rule, if the extended cyclic prefix structure, then write the first location element in the periodic report logic unit into the first virtual matrix array with the column numbers thereof being 0, 3, 5, 8; then progressively writing the first location element in the data information logic block unit into the first virtual matrix row by row starting from the first column of the first virtual matrix in an ascending order of column, and when writing, skipping the locations occupied by the elements in the periodic report logic unit; and likewise, write the second location element in the periodic feedback report logic unit into the predetermined locations of the second virtual matrix according to a rule; and successively write the second location element in the data information logic unit into the second virtual matrix.

When reading out the data, as to each virtual matrix, read out the elements from the matrix column by column starting from the first column of the virtual matrix, within each column, within each column, successively read out the same row by row in an ascending order of row (i.e. the row number increases), among the elements read out, construct the first location element of a control and data information logic unit using the elements read out from the first virtual matrix, and constructing the second location element of the control and data information logic unit using the elements read out from the second virtual matrix, and for each element, read out the same in its bit sequence to finally obtain the control and data information bit sequence.

Mode III: generate a virtual matrix according to the total number of the rank indicator logic unit and data information logic unit, provided that the number of elements in the data information logic unit is $H_1'$, the number of elements in the periodic feedback report logic unit is $Q_{RI}'$, the product of the number of rows and the number of columns in the generated virtual matrix is $(H_1'+Q_{RI}')$; when a subframe uses a conventional cyclic prefix structure, the number of columns of each virtual matrix is 12; and when the subframe uses an extended cyclic prefix structure, the number of columns of each virtual matrix is 10; if there is a measurement reference signal (SRS) to be sent, when the subframe uses the conventional cyclic prefix structure, the number of columns of each virtual matrix is 11; and when the subframe uses the extended cyclic prefix structure, the number of columns of each virtual matrix is 9;

when writing data into the virtual matrix, write the first location element in each logic unit into the virtual matrix according to the following manner: first writing the first location element in the periodic feedback report logic unit into predetermined locations of the virtual matrix in every other row starting from the second to the last row of the virtual matrix (i.e. the write order is the (n−1)th row, the (n−3)th row, . . . , until the writing of the first location element in the periodic feedback report logic unit is completed), then write the first location element in the data information logic unit into the virtual matrix in every other row starting from the first row of the virtual matrix in an ascending order of row (i.e. the write order is the $1^{st}$ row, the $3^{rd}$ row, . . . , until the writing of the first location element in the data information logic unit is completed), when writing, skip the locations occupied by the elements in the periodic report logic unit;

when writing data into the virtual matrix, write the second location element in each logic unit into the virtual matrix according to the following manner: second writing the second location element in the periodic feedback report logic unit into the predetermined locations of the virtual matrix in every other row starting from the last row of the virtual matrix (i.e. the write order is the nth row, the (n−2)th row, . . . , until the writing of the second location element in the periodic feedback report logic unit is completed), then write the second location element in the data information logic unit into the virtual matrix in every other row starting from the second row of the virtual matrix (i.e. the write order is the $2^{nd}$ row, the $4^{th}$ row, . . . , until the writing of the second location element in the data information logic unit is completed), when writing, skip the locations occupied by the elements in the periodic report logic unit; and when reading out the data, read out the elements from that matrix column by column starting from the first column of the virtual matrix, as to each column, successively read out the same from top to bottom (i.e. the row number increases), and for each element, read out the same in its bit sequence to finally obtain the control and data information bit sequence.

The first location element described in method I, II and III in the above situation II refers the first half of elements in the logic unit, and the second location element refers to the second half of elements in the logic unit; or the first location element refers to the second half of elements in the logic unit, and the second location element refers to the first half of elements in the logic unit; or, when the element ordering number in the logic unit starts from 0, the first location element refers to even elements in the corresponding logic unit, and the second location element refers to odd elements in the corresponding logic unit; or, when the element ordering number in the corresponding logic unit starts from 1, the first location element refers to odd elements in the corresponding logic unit, and the second location element refers to even elements in the corresponding logic unit.

In this embodiment, by way of carrying out coding, interleaving, etc. on the periodic feedback report and data information, it is achieved that the periodic feedback report can be transmitted on the PUSCH in the LTE-A system, solving the problem that the periodic feedback report cannot be transmitted on the PUSCH and optimizing the system.

Embodiment 3

Figure 5:
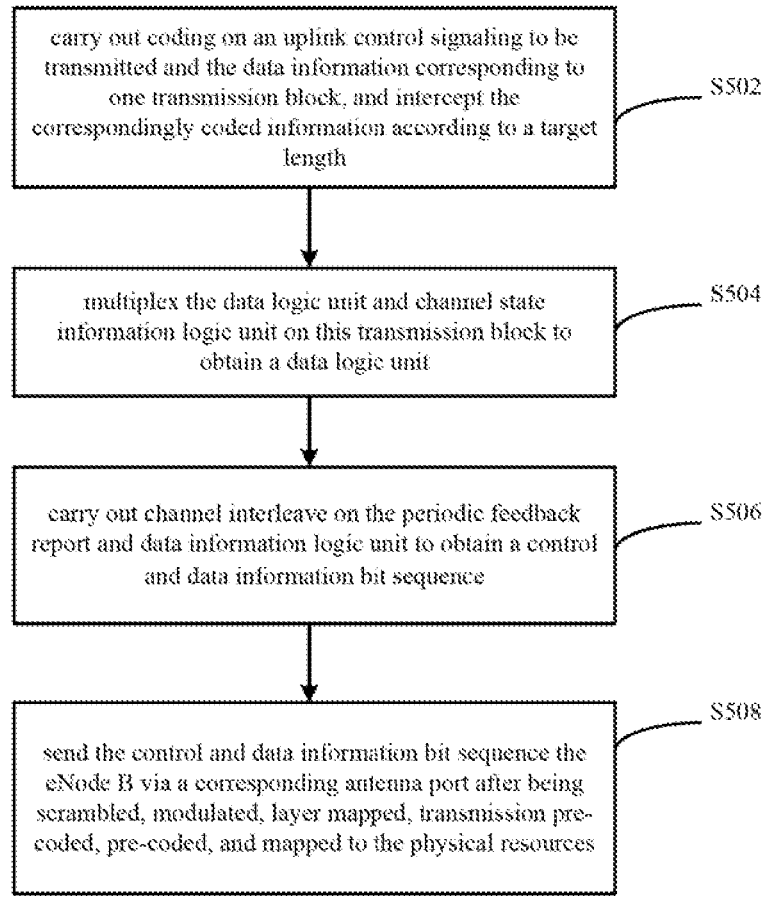
FIG. 5 is a flowchart of a method for transmitting a periodic feedback report according to embodiment 3 of the present invention.

This embodiment corresponds to the situation there only one transmission block is configured and this data block has data, and FIG. 5 is a flowchart of an embodiment II of a method for transmitting a periodic feedback report on a physical uplink shared channel according to the embodiments of the present invention; as shown in FIG. 5, the method for transmitting a periodic feedback report on a physical uplink shared channel according to the embodiments of the present invention mainly includes the following process (steps S502 to S508):

Step S502: carry out coding on an uplink control signaling to be transmitted and the data information corresponding to one transmission block, and intercept the correspondingly coded information according to the target length;

Step S504: multiplex the data logic unit and channel state information logic unit on this transmission block to obtain a data logic unit;

Step S506: carry out channel interleave on the periodic feedback report and data information logic unit to obtain a control and data information bit sequence;

Step S508: send the control and data information bit sequence the eNode B via a corresponding antenna port after being scrambled, modulated, layer mapped, transmission pre-coded, pre-coded, and mapped to the physical resources.

The above interleave processing can be carried out by reference to the mode in embodiment 1 or 2, in addition, this embodiment further includes the situation that scrambling occurs before interleave, and the particular processing can be implemented by reference to the related art, which need not be described here.

In this embodiment, by way of carrying out coding, interleaving, etc. on the periodic feedback report and data information, it is achieved that the periodic feedback report can be transmitted on the PUSCH in the LTE-A system, solving the problem that the periodic feedback report cannot be transmitted on the PUSCH and optimizing the system.

Embodiment 4

Figure 6:
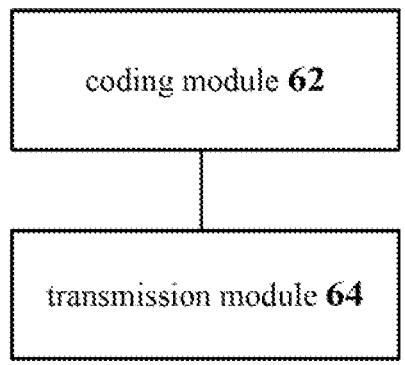
FIG. 6 is a structural block diagram of an apparatus for transmitting a periodic feedback report according to embodiment 4 of the present invention.

FIG. 6 is a structural block diagram of an apparatus for transmitting a periodic feedback report according to the embodiments of the present invention, which apparatus includes a coding module 62 and a transmission module 64;

the coding module 62 is configured to code a periodic feedback report to be transmitted and data information corresponding to a transmission block respectively, wherein the periodic feedback report includes one of the following information: a combined coding index of rank indicator (RI) information and first pre-coding matrix indicator (PMI-1) information, a combined coding index of the RI and pre-coding type indication (PTI) information, and the PMI-1; and the transmission module 64 connected to the coding module 62 is configured to, when a transmission block corresponds to a single layer or multiple layers, carry out channel interleave on the coded information on the single layer or multiple layers to be transmitted on the transmission block, and transmit the interleaved information on a layer corresponding to a physical uplink shared channel (PUSCH).

Preferably, the transmission module 64 includes: a mapping unit being configured to map the transmitted periodic feedback report onto two timeslots of one subframe, with the periodic feedback report being mapped onto a orthogonal frequency division multiplex (OFDM) symbol at a specific location in one subframe, with the OFDM at the specific location referring to an OFDM symbol adjacent to and separated from an OFDM symbol where a demodulation reference signal is located by an OFDM symbol.

The coding module 62 includes: a determination unit being configured to determine a periodic feedback report to be transmitted; a selecting unit being configured to select a transmission block to transmit the periodic feedback report, wherein the transmission block is a transmission block configured by a current uplink channel, there are one or two transmission blocks, with each transmission block having corresponding data information; and a coding unit being configured to code the determined periodic feedback report and the data information corresponding to the selected transmission block.

The selecting unit selects a transmission block is as follows: if two transmission blocks are configured by the uplink channel, then select these two transmission blocks; and if one transmission block is configured, then select this transmission block.

This apparatus further includes: a generation unit being configured to generate a periodic feedback report logic unit and a data information logic unit using the periodic feedback report and data information corresponding to the transmission block coded by the coding unit in the form of modulation symbol; and accordingly, the transmission module 64 comprises: a sequence acquisition unit being configured to carry out channel interleave on the periodic feedback report logic unit and the data information logic unit on each of the transmission blocks to obtain a control and data information bit sequence.

According to the difference in the number of transmission blocks selected by the selecting unit, the transmission module 64 includes: a first transmission unit being configured to, if the selecting unit selects one transmission block, place the control and data information bit sequence on the transmission block acquired by the sequence acquisition unit on a layer corresponding to the PUSCH for transmission, and a second transmission unit being configured to, if the selecting unit selects two transmission blocks, place the control and data information bit sequence on a first one of the two transmission blocks acquired by the sequence acquisition unit on a layer corresponding to the first transmission block on the PUSCH for transmission, and place the control and data information bit sequence on a second one of the two transmission blocks acquired by the sequence acquisition unit on a layer corresponding to the second transmission block on the PUSCH for transmission.

According to the number of corresponding transport layers when being transmitted on the PUSCH, the control and data information bit sequence can have different acquisition modes, and the particular modes are as follows:

Mode I: the above sequence acquisition unit includes: a sequence acquisition sub-unit being configured to, when a number of transport layers corresponding to the transmission block being transmitted on the PUSCH is 1, carry out channel interleave on the periodic feedback report logic unit and the data information logic unit to obtain a control and data information bit sequence.

In this case, the sequence acquisition sub-unit includes: a first matrix generation sub-unit being configured to generate a virtual matrix according to the total number of the periodic report logic unit and the data information logic unit; a first data writing unit being configured to, when writing data into the virtual matrix generated by the first matrix generation sub-unit, first progressively write elements in the periodic report logic unit into predetermined locations of the virtual matrix row by row starting from the last row of the virtual matrix in a descending order of row, within any row, successively write the same from left to right into respective columns of the predetermined locations; write elements in the data information logic unit into the virtual matrix row by row starting from the first row of the virtual matrix in an ascending order of row, within any row, successively write the same into locations except those locations already occupied by the elements in the periodic report logic unit in an order from left to right; and a first data readout sub-unit being configured to, when reading out the data from the virtual matrix written by the first data write sub-unit, read out the elements from that matrix column by column starting from the first column of the virtual matrix, within each column, successively read out the same row by row in an ascending order of row, and for each element, read out the same in its bit sequence to finally obtain the control and data information bit sequence.

Mode II: the sequence acquisition unit includes:

a second matrix generation sub-unit being configured to, when a number of transport layers corresponding to the transmission block being transmitted on the PUSCH is 2, generate a periodic feedback report logic block unit and a data information logic block unit according to the periodic feedback report logic unit and the data information logic unit; and generate a virtual matrix according to a total number of the periodic feedback report logic unit and the data information logic unit;

a second data writing sub-unit being configured to, when writing data into the virtual matrix generated by the second matrix generation sub-unit, first progressively write elements in the periodic feedback report logic block unit into predetermined locations of the virtual matrix row by row starting from the last row of the virtual matrix in a descending order of row; and write elements in the data information logic block unit into the virtual matrix row by row starting from the first row of the virtual matrix in an ascending order of row, and skipping the locations occupied by the elements in the periodic report logic block unit; and a second data readout sub-unit being configured to, when reading out the data from the virtual matrix written by the second data write sub-unit, read out the elements from that matrix column by column starting from the first column of the virtual matrix, within each column, successively reading out the same row by row in an ascending order of row, and for each element, reading out the same in its bit sequence to finally obtain the control and data information bit sequence.

In this case, the second matrix generation sub-unit comprises: a construction sub-unit being configured to construct a first periodic feedback report logic sub-unit using a first location element in the periodic feedback report logic unit, and construct a second periodic feedback report logic sub-unit using a second location element in the periodic feedback report logic unit; and construct a first data information logic sub-unit using a first location element in the data information logic unit; and construct a second data information logic sub-unit using a second location element in the data information logic unit; and a logic block combination sub-unit being configured to combine the first and second periodic feedback report logic sub-units into a periodic feedback report logic block unit; and combine the first and second data information logic sub-units into a data information logic block unit.

Mode III: the sequence acquisition unit includes:

a third matrix generation sub-unit being configured to, when a number of transport layers corresponding to the transmission block being transmitted on the PUSCH is 2, generate a virtual matrix according to the total number of the periodic feedback report logic unit and the data information logic unit;

a third data writing sub-unit being configured to, when writing data into the virtual matrix generated by the third matrix generation sub-unit, write the first location element in the periodic feedback report logic unit and the first location element in the data information logic unit into the virtual matrix in the following manner: first writing the first location element in the periodic feedback report logic unit into predetermined locations of the virtual matrix in every other row starting from the second to the last row of the virtual matrix; then writing the first location element in the data information logic unit into the virtual matrix in every other row starting from the first row of the virtual matrix in an ascending order of row, and skipping the locations occupied by the elements in the periodic report logic unit; and a third data readout sub-unit being configured to, when reading out the data from the virtual matrix written by the third data write sub-unit, read out the elements from that matrix column by column starting from the first column of the virtual matrix, within each column, successively read out the same row by row in an ascending order of row, and for each element, read out the same in its bit sequence to finally obtain the control and data information bit sequence.

Mode IV: the sequence acquisition unit includes:

a fourth matrix generation sub-unit being configured to, when a number of transport layers corresponding to the transmission block being transmitted on the PUSCH is 2, generate two virtual matrixes according to the total number of the periodic feedback report logic unit and the data information logic unit, which are respectively a first virtual matrix and a second virtual matrix;

a fourth data writing sub-unit being configured to, when writing data into the first virtual matrix, first progressively write the first location element in the periodic feedback report logic block unit into predetermined locations of the first virtual matrix row by row starting from the last row of the first virtual matrix in a descending order of row; write the first location element in the data information logic block unit into the first virtual matrix row by row starting from the first column of the first virtual matrix in an ascending order of column, and skipping the locations occupied by the elements in the periodic report logic block unit; and when writing data into the second virtual matrix, first progressively write the second element in the periodic feedback report logic block unit into predetermined locations of the second virtual matrix row by row starting from the last row of the second virtual matrix in a descending order of row; write the second location element in the data information logic block unit into the second virtual matrix row by row starting from the first row of the second virtual matrix in an ascending order of row, and skipping the locations occupied by the elements in the periodic report logic block unit; and a fourth data readout sub-unit being configured to read out the data from the first and second virtual matrix, as to each virtual matrix, read out the elements from the matrix column by column starting from the first column of the virtual matrix, within each column, successively read out the same row by row in an ascending order of row, among the elements read out, constructing the first location element of a control and data information logic unit using the elements read out from the first virtual matrix, and construct the second location element of the control and data information logic unit using the elements read out from the second virtual matrix, and for each element, read out the same in its bit sequence to finally obtain the control and data information bit sequence.

In this case, the periodic feedback report includes one of the following information: a combined coding index of rank indicator (RI) information and first pre-coding matrix indicator (PMI-1) information, a combined coding index of the RI and pre-coding type indication (PTI) information, and the PMI-1.

Furthermore, the transmission module 64 carries out channel interleave on the periodic feedback report logic unit and the data information logic unit on each transmission block to obtain a control and data information bit sequence; and the transmission module 64 is combined with the resource element mapped for PUSCH to achieve the mapping with priority time, and this mapping transforms a modulation symbol into a sending waveform and at the same time ensures that the transmitted periodic feedback report is on two timeslots of one subframe, the transmitted periodic feedback report is mapped to an OFDM symbol with specific location, with the OFDM symbol with specific location referring to an OFDM symbol adjacent to the OFDM symbol where the demodulation reference signal is located spaced with one OFDM symbol.

Placing the periodic feedback report on a specific location OFDM symbol on a subframe for transmission not only ensures the high reliable transmission of the periodic feedback report on the PUSCH but also ensures the compatibility with the original system.

In this embodiment, by way of carrying out coding, interleaving, etc. on the periodic feedback report and data information, it is achieved that the periodic feedback report can be transmitted on the PUSCH in the LTE-A system, solving the problem that the periodic feedback report cannot be transmitted on the PUSCH and optimizing the system.

It can be seen from the above description that the present invention achieves the following technical effects: in this embodiment, by way of carrying out coding, interleaving, etc. on the periodic feedback report and data information, it is achieved that the periodic feedback report can be transmitted on the PUSCH in the LTE-A system, even the PUSCH in the LTE-A system utilizes the space multiplexing manner, the uplink control signaling can still be transmitted over the PUSCH. The problem that the periodic feedback report cannot be transmitted over the PUSCH is solved, optimizing the system.

Obviously, those skilled in the art should understand that the above module or steps of the present invention can be implemented using a general-purpose computing apparatus, and they can be integrated on a single computing apparatus or distributed over a network consisted of multiple computing apparatus; optionally, they can be implemented using computing apparatus executable program code, thus, they can be stored in a storage for being executed by the computing apparatus, and in some cases, the shown or described steps can be performed in an order different from the order here, or they can be made into various integrated circuit modules respectively, or some modules or steps therein are made into a single integrated circuit module for implementation. In this way, the present invention is not limited to any particular combination of hardware and software.

Above description is only to illustrate the preferred embodiments but not to limit the present invention. Various alternations and changes to the present invention are apparent to those skilled in the art. The scope defined in claims shall comprise any medication, equivalent substitution and improvement within the spirit and principle of the present invention.

What is claimed is:

1. A method for transmitting a periodic feedback report, comprising:
   coding a periodic feedback report to be transmitted and data information corresponding to a transmission block respectively, wherein the periodic feedback report includes one of the following information: a combined coding index of rank indicator (RI) information and first pre-coding matrix indicator (PMI-1) information, a combined coding index of the RI and pre-coding type indication (PTI) information, and the PMI-1;
   intercepting correspondingly coded information according to a target length; and
   when a transmission block corresponds to a single layer or multiple layers, carrying out channel interleave on the coded information on the single layer or multiple layers to be transmitted on the transmission block, and transmitting the interleaved information on a layer corresponding to a physical uplink shared channel (PUSCH);
   wherein the carrying out channel interleave on the coded information on the single layer or multiple layers to be transmitted on the transmission block and transmitting the interleaved information on a layer corresponding to a physical uplink shared channel (PUSCH) comprises:
   mapping the transmitted periodic feedback report onto two timeslots of one subframe, with the periodic feedback report being mapped onto an orthogonal frequency division multiplex (OFDM) symbol at a specific location in one subframe, with the OFDM at the specific location referring to an OFDM symbol adjacent to and separated from an OFDM symbol where a demodulation reference signal is located by an OFDM symbol.

2. The method according to claim 1, wherein the coded information on the single layer or multiple layers comprises one of the following: coded periodic feedback report information, a combination of coded data information and coded periodic feedback report information.

3. The method according to claim 1, wherein the coding a periodic feedback report to be transmitted and data information corresponding to a transmission block respectively comprises:
  determining a periodic feedback report to be transmitted;
  selecting a transmission block to transmit the periodic feedback report, wherein the transmission block is a transmission block configured by a current uplink channel, there are one or two transmission blocks, with each transmission block having corresponding data information; and
  coding the determined periodic feedback report and the data information corresponding to the selected transmission block.

4. The method according to claim 3, wherein
  after the coding the determined periodic feedback report and the data information corresponding to the selected transmission block, the method further comprises: generating a periodic feedback report logic unit and a data information logic unit using the coded periodic feedback report information and coded data information corresponding to the transmission block in the form of modulation symbol; and
  the carrying out channel interleave on the coded information on the single layer or multiple layers to be transmitted on the transmission block comprises: carrying out channel interleave on the periodic feedback report logic unit and the data information logic unit on each transmission block to obtain a control and data information bit sequence.

5. The method according to claim 4, wherein the transmitting the interleaved information on a layer corresponding to a PUSCH comprises:
  if one transmission block is selected, then placing the control and data information bit sequence on the transmission block on a layer corresponding to the PUSCH for transmission; and
  if two transmission blocks are selected, then placing the control and data information bit sequence on a first one of the two transmission blocks on a layer on the PUSCH corresponding to the first transmission block for transmission and placing the control and data information bit sequence on a second one of the two transmission blocks on a layer on the PUSCH corresponding to the second transmission block for transmission.

6. The method according to claim 4, wherein the carrying out channel interleave on the periodic feedback report logic unit and the data information logic unit on each transmission block to obtain a control and data information bit sequence comprises:
  when a number of transport layers corresponding to the transmission block being transmitted on the PUSCH is 1, carrying out channel interleave on the periodic feedback report logic unit and the data information logic unit to obtain a control and data information bit sequence.

7. The method according to claim 6, wherein the carrying out channel interleave on the periodic feedback report logic unit and the data information logic unit to obtain a control and data information bit sequence comprises:
  generating a virtual matrix according to a total number of the periodic report logic unit and the data information logic unit;
  when writing data into the virtual matrix, first progressively writing elements in the periodic report logic unit into predetermined locations of the virtual matrix row by row starting from the last row of the virtual matrix in a descending order of row, within any row, successively writing the same from left to right into respective columns of the predetermined locations; and writing elements in the data information logic unit into the virtual matrix row by row starting from the first row of the virtual matrix in an ascending order of row, within any row, successively writing the same into locations except those locations already occupied by the elements in the periodic report logic unit in an order from left to right; and
  when reading out the data from the virtual matrix, reading out the elements from that matrix column by column starting from the first column of the virtual matrix, within each column, successively reading out the same row by row in an ascending order of row, and for each element, reading out the same in its bit sequence to finally obtain the control and data information bit sequence.

8. The method according to claim 7, wherein the number of elements in the periodic feedback report logic unit is $M_{RI}$, the number of elements in the data information logic unit is M, and the product of the number of rows and the number of columns in the generated virtual matrix is $(M+M_{RI})$;
  if there is no measurement reference signal (SRS) to be sent, when a subframe uses a conventional cyclic prefix structure, the number of columns of the virtual matrix is 12; and when the subframe uses an extended cyclic prefix structure, the number of columns of the virtual matrix is 10;
  if there is a measurement reference signal (SRS) to be sent, when the subframe uses the conventional cyclic prefix structure, the number of columns of the virtual matrix is 11; and when the subframe uses the extended cyclic prefix structure, the number of columns of the virtual matrix is 9; and
  when the current subframe uses the conventional cyclic prefix, the predetermined locations refer to a virtual matrix array with the column numbers thereof being 1, 4, 7 and 10; and when the current subframe uses the extended cyclic prefix, the predetermined locations refer to a virtual matrix array with the column numbers thereof being 0, 3, 5 and 8.

9. The method according to claim 4, wherein the carrying out channel interleave on the periodic feedback report logic unit and the data information logic unit on each of the transmission blocks to obtain a control and data information bit sequence comprises:
  when a number of transport layers corresponding to the transmission block being transmitted on the PUSCH is 2, generating a periodic feedback report logic block unit and a data information logic block unit according to the periodic feedback report logic unit and the data information logic unit;
  generating a virtual matrix according to a total number of the periodic report logic block unit and the data information logic block unit;
  when writing data into the virtual matrix, first progressively writing elements in the periodic feedback report logic block unit into predetermined locations of the virtual matrix row by row starting from the last row of the virtual matrix in a descending order of row; then progressively writing elements in the data information logic block unit into the virtual matrix row by row starting from the first row of the virtual matrix in an ascending order of row, and skipping the locations occupied by the elements in the periodic report logic block unit; and when reading out the data from the virtual matrix, reading out the elements from that matrix column by column starting from the first column of the virtual matrix, within each column, successively reading out the same row by row in an ascending order of row, and for each element, reading out the same in its bit sequence to finally obtain the control and data information bit sequence.

10. The method according to claim 9, wherein the generating a periodic feedback report logic block unit and a data information logic block unit according to the periodic feedback report logic unit and the data information logic unit comprises:

constructing a first periodic feedback report logic sub-unit using a first location element in the periodic feedback report logic unit, and constructing a second periodic feedback report logic sub-unit using a second location element in the periodic feedback report logic unit;

constructing a first data information logic sub-unit using a first location element in the data information logic unit; and constructing a second data information logic sub-unit using a second location element in the data information logic unit; and combining the first and second periodic feedback report logic sub-units into a periodic feedback report logic block unit; and combining the first and second data information logic sub-units into a data information logic block unit.

11. The method according to claim 10, wherein the number of elements in the periodic feedback report logic block unit is $M_{RI}$, the number of elements in the data information logic block unit is M, and the product of the number of rows and the number of columns in the generated virtual matrix is $(M+M_{RI})$;

if there is no SRS to be sent, when the subframe uses the conventional cyclic prefix structure, the number of columns of the virtual matrix is 12; and when the subframe uses the extended cyclic prefix structure, the number of columns of the virtual matrix is 10;

if there is an SRS to be sent, when the subframe uses the conventional cyclic prefix structure, the number of columns of the virtual matrix is 11; and when the subframe uses the extended cyclic prefix structure, the number of columns of the virtual matrix is 9; and when the current subframe uses the conventional cyclic prefix, the predetermined locations refer to a virtual matrix array with the column numbers thereof being 1, 4, 7 and 10; and when the current subframe uses the extended cyclic prefix, the predetermined locations refer to a virtual matrix array with the column numbers thereof being 0, 3, 5 and 8.

12. The method according to claim 9, wherein the number of elements in the periodic feedback report logic block unit is $M_{RI}$, the number of elements in the data information logic block unit is M, and the product of the number of rows and the number of columns in the generated virtual matrix is $(M+M_{RI})$;

if there is no SRS to be sent, when the subframe uses the conventional cyclic prefix structure, the number of columns of the virtual matrix is 12; and when the subframe uses the extended cyclic prefix structure, the number of columns of the virtual matrix is 10;

if there is an SRS to be sent, when the subframe uses the conventional cyclic prefix structure, the number of columns of the virtual matrix is 11; and when the subframe uses the extended cyclic prefix structure, the number of columns of the virtual matrix is 9; and when the current subframe uses the conventional cyclic prefix, the predetermined locations refer to a virtual matrix array with the column numbers thereof being 1, 4, 7 and 10; and when the current subframe uses the extended cyclic prefix, the predetermined locations refer to a virtual matrix array with the column numbers thereof being 0, 3, 5 and 8.

13. The method according to claim 4, wherein the carrying out channel interleave on the periodic feedback report logic unit and the data information logic unit on each of the transmission blocks to obtain a control and data information bit sequence comprises:

when a number of transport layers corresponding to the transmission block being transmitted on the PUSCH is 2, generating a virtual matrix according to the total number of the periodic feedback report logic unit and the data information logic unit;

when writing data into the virtual matrix, writing the first location element in the periodic feedback report logic unit and the first location element in the data information logic unit into the virtual matrix in the following manner: first writing the first location element in the periodic feedback report logic unit into predetermined locations of the virtual matrix in every other row starting from the second to the last row of the virtual matrix; then writing the first location element in the data information logic unit into the virtual matrix in every other row starting from the first row of the virtual matrix in an ascending order of row, and skipping the locations occupied by the elements in the periodic report logic unit; and when reading out the data from the virtual matrix, reading out the elements from that matrix column by column starting from the first column of the virtual matrix, within each column, successively reading out the same row by row in an ascending order of row, and for each element, reading out the same in its bit sequence to finally obtain the control and data information bit sequence.

14. The method according to claim 13, wherein the number of elements in the data information logic unit is $H_1'$, the number of elements in the periodic feedback report logic unit is $Q_{RI}'$ and the product of the number of rows and the number of columns in the generated virtual matrix is $(H_1'+Q_{RI}')$;

if there is no measurement reference signal (SRS) needed to be sent, when the subframe uses the conventional cyclic prefix structure, the number of columns of the virtual matrix is 12; and when the subframe uses the extended cyclic prefix structure, the number of columns of the virtual matrix is 10;

if there is a measurement reference signal (SRS) needed to be sent, when the subframe uses the conventional cyclic prefix structure, the number of columns of the virtual matrix is 11; and when the subframe uses the extended cyclic prefix structure, the number of columns of the virtual matrix is 9; and when the current subframe uses the conventional cyclic prefix, the predetermined locations refer to a virtual matrix array with the column numbers thereof being 1, 4, 7 and 10; and when the current subframe uses the extended cyclic prefix, the predetermined locations refer to a virtual matrix array with the column numbers thereof being 0, 3, 5 and 8.

15. The method according to claim 13, wherein the first location element and the second location element are a combination of one of the following:
- the first location element refers to the first half of elements in a corresponding logic unit, and the second location element refers to the second half of elements in the corresponding logic unit;
- the first location element refers to the second half of elements in a corresponding logic unit, and the second location element refers to the first half of elements in the corresponding logic unit;
- when the element ordering number in the corresponding logic unit starts from 0, the first location element refers to even elements in the corresponding logic unit, and the second location element refers to odd elements in the corresponding logic unit; and
- when the element ordering number in the corresponding logic unit starts from 1, the first location element refers to odd elements in the corresponding logic unit, and the second location element refers to even elements in the corresponding logic unit.

16. The method according to claim 4, wherein the carrying out channel interleave on the periodic feedback report logic unit and the data information logic unit on each of the transmission blocks to obtain a control and data information bit sequence comprises:
- when a number of transport layers corresponding to the transmission block being transmitted on the PUSCH is 2, generating two virtual matrixes according to the total number of the periodic feedback report logic unit and the data information logic unit, which are respectively a first virtual matrix and a second virtual matrix;
- when writing data into the first virtual matrix, first progressively writing the first location element in the periodic feedback report logic block unit into predetermined locations of the first virtual matrix row by row starting from the last row of the first virtual matrix in a descending order of row; then progressively writing the first location element in the data information logic block unit into the first virtual matrix row by row starting from the first column of the first virtual matrix in an ascending order of column, and skipping the locations occupied by the elements in the periodic report logic block unit;
- when writing data into the second virtual matrix, first progressively writing the second element in the periodic feedback report logic block unit into predetermined locations of the second virtual matrix row by row starting from the last row of the second virtual matrix in a descending order of row; then progressively writing the second location element in the data information logic block unit into the second virtual matrix row by row starting from the first row of the second virtual matrix in an ascending order of row, and skipping the locations occupied by the elements in the periodic report logic block unit; and
- reading out the data from the first and second virtual matrix, as to each virtual matrix, reading out the elements from the matrix column by column starting from the first column of the virtual matrix, within each column, successively reading out the same row by row in an ascending order of row, among the elements read out, constructing the first location element of a control and data information logic unit using the elements read out from the first virtual matrix, and constructing the second location element of the control and data information logic unit using the elements read out from the second virtual matrix, and for each element, reading out the same in its bit sequence to finally obtain the control and data information bit sequence.

17. The method according to claim 16, wherein the number of elements in the data information logic unit is $H_1'$, the number of elements in the periodic feedback report logic unit is $Q_{RI}'$, and the product of the number of rows and the number of columns in the generated virtual matrix is $(H_1' + Q_{RI}')/2$;
- if there is no SRS to be sent, when the subframe uses the conventional cyclic prefix structure, the number of columns of each virtual matrix is 12; and when the subframe uses the extended cyclic prefix structure, the number of columns of each virtual matrix is 10;
- if there is an SRS to be sent, when the subframe uses the conventional cyclic prefix structure, the number of columns of each virtual matrix is 11; and when the subframe uses the extended cyclic prefix structure, the number of columns of each virtual matrix is 9; and
- when the current subframe uses the conventional cyclic prefix, the predetermined locations refer to a virtual matrix array with the column numbers thereof being 1, 4, 7 and 10; and when the current subframe uses the extended cyclic prefix, the predetermined locations refer to a virtual matrix array with the column numbers thereof being 0, 3, 5 and 8.

18. The method according to claim 16, wherein the first location element and the second location element are a combination of one of the following:
- the first location element refers to the first half of elements in a corresponding logic unit, and the second location element refers to the second half of elements in the corresponding logic unit;
- the first location element refers to the second half of elements in a corresponding logic unit, and the second location element refers to the first half of elements in the corresponding logic unit;
- when the element ordering number in the corresponding logic unit starts from 0, the first location element refers to even elements in the corresponding logic unit, and the second location element refers to odd elements in the corresponding logic unit; and
- when the element ordering number in the corresponding logic unit starts from 1, the first location element refers to odd elements in the corresponding logic unit, and the second location element refers to even elements in the corresponding logic unit.

19. A user equipment (UE), comprising a computing apparatus, a memory and program modules stored in the memory, and the computing apparatus is configured to execute the program modules, wherein the program modules comprise:
- a coding module being configured to code a periodic feedback report to be transmitted and data information corresponding to a transmission block respectively and intercept the correspondingly coded information according to a target length, wherein the periodic feedback report includes one of the following information: a combined coding index of rank indicator (RI) information and first pre-coding matrix indicator (PMI-1) information, a combined coding index of the RI and pre-coding type indication (PTI) information, and the PMI-1; and
- a transmission module being configured to, when a transmission block corresponds to a single layer or multiple layers, carry out channel interleave on the coded information on the single layer or multiple layers to be transmitted on the transmission block, and transmit the interleaved information on a layer corresponding to a physical uplink shared channel (PUSCH);

wherein the transmission module comprises:

a mapping unit being configured to map the transmitted periodic feedback report onto two timeslots of one subframe, with the periodic feedback report being mapped onto an orthogonal frequency division multiplex (OFDM) symbol at a specific location in one subframe, with the OFDM at the specific location referring to an OFDM symbol adjacent to and separated from an OFDM symbol where a demodulation reference signal is located by an OFDM symbol.

20. The UE according to claim 19, wherein the coding module comprises:

a determination unit being configured to determine a periodic feedback report to be transmitted;

a selecting unit being configured to select a transmission block to transmit the periodic feedback report, wherein the transmission block is a transmission block configured by a current uplink channel, there are one or two transmission blocks, with each transmission block having corresponding data information; and a coding unit being configured to code the determined periodic feedback report and the data information corresponding to the selected transmission block.

21. The UE according to claim 20, wherein the UE further comprises:

a generation unit being configured to generate a periodic feedback report logic unit and a data information logic unit using the periodic feedback report and data information corresponding to the transmission block coded by the coding unit in the form of modulation symbol; and the transmission module comprises: a sequence acquisition unit being configured to carry out channel interleave on the periodic feedback report logic unit and the data information logic unit on each of the transmission blocks to obtain a control and data information bit sequence.

22. The UE according to claim 21, wherein the transmission module comprises:

a first transmission unit being configured to, if the selecting unit selects one transmission block, place the control and data information bit sequence on the transmission block acquired by the sequence acquisition unit on a layer corresponding to the PUSCH for transmission; and a second transmission unit being configured to, if the selecting unit selects two transmission blocks, place the control and data information bit sequence on a first one of the two transmission blocks acquired by the sequence acquisition unit on a layer corresponding to the first transmission block on the PUSCH for transmission, and place the control and data information bit sequence on a second one of the two transmission blocks acquired by the sequence acquisition unit on a layer corresponding to the second transmission block on the PUSCH for transmission.

23. The UE according to claim 21, wherein the sequence acquisition unit comprises:

a sequence acquisition sub-unit being configured to, when a number of transport layers corresponding to the transmission block being transmitted on the PUSCH is 1, carry out channel interleave on the periodic feedback report logic unit and the data information logic unit to obtain a control and data information bit sequence.

24. The UE according to claim 23, wherein the sequence acquisition sub-unit comprises:

a first matrix generation sub-unit being configured to generate a virtual matrix according to a total number of the periodic report logic unit and the data information logic unit;

a first data writing unit being configured to, when writing data into the virtual matrix generated by the first matrix generation sub-unit, first progressively write elements in the periodic report logic unit into predetermined locations of the virtual matrix row by row starting from the last row of the virtual matrix in a descending order of row, within any row, successively write the same from left to right into respective columns of the predetermined locations; and progressively write elements in the data information logic unit into the virtual matrix row by row starting from the first row of the virtual matrix in an ascending order of row, within any row, successively write the same into locations except those locations already occupied by the elements in the periodic report logic unit in an order from left to right; and a first data readout sub-unit being configured to, when reading out the data from the virtual matrix written by the first data write sub-unit, read out the elements from that matrix column by column starting from the first column of the virtual matrix, within each column, successively read out the same row by row in an ascending order of row, and for each element, read out the same in its bit sequence to finally obtain the control and data information bit sequence.

25. The UE according to claim 21, wherein the sequence acquisition unit comprises:

a second matrix generation sub-unit being configured to, when a number of transport layers corresponding to the transmission block being transmitted on the PUSCH is 2, generate a periodic feedback report logic block unit and a data information logic block unit according to the periodic feedback report logic unit and the data information logic unit; and generate a virtual matrix according to a total number of the periodic feedback report logic block unit and the data information logic block unit;

a second data writing sub-unit being configured to, when writing data into the virtual matrix generated by the second matrix generation sub-unit, first progressively write elements in the periodic feedback report logic block unit into predetermined locations of the virtual matrix row by row starting from the last row of the virtual matrix in a descending order of row; then progressively write elements in the data information logic block unit into the virtual matrix row by row starting from the first row of the virtual matrix in an ascending order of row, and skip the locations occupied by the elements in the periodic report logic block unit; and a second data readout sub-unit being configured to, when reading out the data from the virtual matrix written by the second data write sub-unit, read out the elements from that matrix column by column starting from the first column of the virtual matrix, within each column, successively read out the same row by row in an ascending order of row, and for each element, read out the same in its bit sequence to finally obtain the control and data information bit sequence.

26. The UE according to claim 25, wherein the second matrix generation sub-unit comprises:

a construction sub-unit being configured to construct a first periodic feedback report logic sub-unit using a first location element in the periodic feedback report logic unit, and construct a second periodic feedback report logic sub-unit using a second location element in the periodic feedback report logic unit; and construct a first data information logic sub-unit using a first location element in the data information logic unit; and construct a second data information logic sub-unit using a second location element in the data information logic unit; and a logic block combination sub-unit being configured to combine the first and second periodic feedback report logic sub-units into a periodic feedback report logic block unit; and combine the first and second data information logic sub-units into a data information logic block unit.

27. The UE according to claim 21, wherein the sequence acquisition unit comprises:

a third matrix generation sub-unit being configured to, when a number of transport layers corresponding to the transmission block being transmitted on the PUSCH is 2, generate a virtual matrix according to the total number of the periodic feedback report logic unit and the data information logic unit;

a third data writing sub-unit being configured to, when writing data into the virtual matrix generated by the third matrix generation sub-unit, write the first location element in the periodic feedback report logic unit and the first location element in the data information logic unit into the virtual matrix in the following manner: first write the first location element in the periodic report logic unit into predetermined locations of the virtual matrix in every other row starting from the second to the last row of the virtual matrix; then write the first location element in the data information logic unit into the virtual matrix in every other row starting from the first row of the virtual matrix in an ascending order of row, and skip the locations occupied by the elements in the periodic report logic unit; and a third data readout sub-unit being configured to, when reading out the data from the virtual matrix written by the third data write sub-unit, read out the elements from that matrix column by column starting from the first column of the virtual matrix, within each column, successively read out the same row by row in an ascending order of row, and for each element, read out the same in its bit sequence to finally obtain the control and data information bit sequence.

28. The UE according to claim 21, wherein the sequence acquisition unit comprises:

a fourth matrix generation sub-unit being configured to, when a number of transport layers corresponding to the transmission block being transmitted on the PUSCH is 2, generate two virtual matrixes according to the total number of the periodic feedback report logic unit and the data information logic unit, which are respectively a first virtual matrix and a second virtual matrix;

a fourth data writing sub-unit being configured to, when writing data into the first virtual matrix, first progressively write the first location element in the periodic feedback report logic block unit into predetermined locations of the first virtual matrix row by row starting from the last row of the first virtual matrix in a descending order of row; write the first location element in the data information logic block unit into the first virtual matrix row by row starting from the first column of the first virtual matrix in an ascending order of column, and skip the locations occupied by the elements in the periodic report logic block unit; and when writing data into the second virtual matrix, first progressively write the second element in the periodic feedback report logic block unit into predetermined locations of the second virtual matrix row by row starting from the last row of the second virtual matrix in a descending order of row; then progressively write the second location element in the data information logic block unit into the second virtual matrix row by row starting from the first row of the second virtual matrix in an ascending order of row, and skip the locations occupied by the elements in the periodic report logic block unit; and a fourth data readout sub-unit being configured to read out the data from the first and second virtual matrix, as to each virtual matrix, read out the elements from the matrix column by column starting from the first column of the virtual matrix, within each column, successively read out the same row by row in an ascending order of row, among the elements read out, construct the first location element of a control and data information logic unit using the elements read out from the first virtual matrix, and construct the second location element of the control and data information logic unit using the elements read out from the second virtual matrix, and for each element, read out the same in its bit sequence to finally obtain the control and data information bit sequence.

* * * * *